United States Patent
Cichowski et al.

(10) Patent No.: US 9,988,200 B2
(45) Date of Patent: *Jun. 5, 2018

(54) PACKAGING FOR FOOD PRODUCT

(75) Inventors: Benjamin M. Cichowski, Naperville, IL (US); Jeffrey A. Czarny, Schaumburg, IL (US)

(73) Assignee: The Hillshire Brands Company, Chicago, IL (US)

( * ) Notice: Subject to any disclaimer, the term of this patent is extended or adjusted under 35 U.S.C. 154(b) by 77 days.

This patent is subject to a terminal disclaimer.

(21) Appl. No.: 13/884,599

(22) PCT Filed: Nov. 9, 2011

(86) PCT No.: PCT/US2011/060001
§ 371 (c)(1),
(2), (4) Date: Jul. 22, 2013

(87) PCT Pub. No.: WO2012/064862
PCT Pub. Date: May 18, 2012

(65) Prior Publication Data
US 2013/0302475 A1    Nov. 14, 2013

Related U.S. Application Data

(63) Continuation-in-part of application No. 12/943,769, filed on Nov. 10, 2010, now abandoned, and a
(Continued)

(51) Int. Cl.
| | | |
|---|---|---|
| *B65D 81/34* | (2006.01) | |
| *B65D 81/26* | (2006.01) | |
| *B65D 75/36* | (2006.01) | |

(52) U.S. Cl.
CPC ....... *B65D 81/3453* (2013.01); *B65D 75/366* (2013.01); *B65D 81/264* (2013.01); *B65D 81/267* (2013.01); *B65D 81/3446* (2013.01)

(58) Field of Classification Search
CPC .............. B65D 81/3453; B65D 75/366; B65D 81/3446; B65D 81/267; B65D 81/264
(Continued)

(56) References Cited

U.S. PATENT DOCUMENTS 2,147,058 A * 2/1939 Kasch et al. .................... 52/578
2,633,284 A    3/1953 Moffett et al.
(Continued)

FOREIGN PATENT DOCUMENTS

| CA | 2817743 | 5/2012 |
|---|---|---|
| DE | 19860473 | 6/2000 |

(Continued)

OTHER PUBLICATIONS

Plasman, Valerie. et al. "Polygylcerol esters demonstrate superior antifogging properties for films." Plastic Additives & Compounding. Apr. 2005.*

(Continued)

*Primary Examiner* — Viren A Thakur
(74) *Attorney, Agent, or Firm* — Duane Morris LLP

(57) ABSTRACT

A packaged food product includes a bottom receptacle having a lower portion defining an interior and an upper portion extending about the upper periphery of the interior; a food product provided within the interior; a top film sealed to the upper portion of the bottom receptacle via a seal portion extending substantially along the upper periphery of the interior and comprising at least one substantially straight side. The seal portion may be configured to release steam at approximately the midpoint of the substantially straight side of the seal portion.

4 Claims, 27 Drawing Sheets

Related U.S. Application Data continuation-in-part of application No. 12/116,109, filed on May 6, 2008.

(60) Provisional application No. 61/460,750, filed on Feb. 24, 2011, provisional application No. 61/453,875, filed on Mar. 17, 2011.

(58) Field of Classification Search
USPC ......... 426/112, 113, 115, 124, 132, 234, 118
See application file for complete search history.

(56) References Cited

U.S. PATENT DOCUMENTS

| | | | |
|---|---|---|---|
| 3,048,263 A * | 8/1962 | Sacks | C08J 5/18 |
| | | | 106/13 |
| 3,048,266 A * | 8/1962 | Hackhel | C08K 5/06 |
| | | | 106/13 |
| 3,528,867 A * | 9/1970 | Heller, Jr. et al. | 156/272.4 |
| 3,558,537 A * | 1/1971 | Brilliant | C08L 27/06 |
| | | | 252/400.24 |
| 3,615,711 A | 10/1971 | Markus et al. | |
| 3,865,953 A * | 2/1975 | Peters | B65B 11/50 |
| | | | 206/461 |
| 3,929,699 A | 12/1975 | Bernholz | |
| 3,997,677 A * | 12/1976 | Hirsch et al. | 426/113 |
| D253,515 S | 11/1979 | Meierhoefer | |
| 4,261,504 A * | 4/1981 | Cowan | 229/123.1 |
| 4,419,373 A * | 12/1983 | Oppermann | B65D 81/3453 |
| | | | 229/120 |
| 4,720,410 A | 1/1988 | Lundquist et al. | |
| 4,786,513 A * | 11/1988 | Monforton et al. | 426/107 |
| 4,801,773 A * | 1/1989 | Hanlon | A47J 36/027 |
| | | | 219/734 |
| 4,834,247 A * | 5/1989 | Oshima et al. | 426/107 |
| 4,861,957 A | 8/1989 | Welles | |
| 4,873,101 A * | 10/1989 | Larson et al. | 426/113 |
| 4,911,938 A | 3/1990 | Fisher et al. | |
| 4,944,409 A | 7/1990 | Busche et al. | |
| 4,961,944 A * | 10/1990 | Matoba et al. | 426/107 |
| 5,002,782 A | 3/1991 | Oberle | |
| 5,039,001 A | 8/1991 | Kinigakis et al. | |
| 5,167,974 A | 12/1992 | Grindrod et al. | |
| 5,310,977 A * | 5/1994 | Stenkamp et al. | 219/730 |
| 5,334,820 A * | 8/1994 | Risch et al. | 219/730 |
| 5,345,069 A | 9/1994 | Grindrod | |
| 5,376,392 A | 12/1994 | Ikegami et al. | |
| 5,399,366 A | 3/1995 | Geddes et al. | |
| 5,405,629 A | 4/1995 | Marnocha et al. | |
| 5,414,248 A * | 5/1995 | Phillips | 219/730 |
| 5,464,969 A | 11/1995 | Miller | |
| 5,520,764 A * | 5/1996 | Toney | B29C 47/0021 |
| | | | 156/244.17 |
| 5,552,169 A | 9/1996 | Kannankeril et al. | |
| 5,573,693 A | 11/1996 | Lorence et al. | |
| 5,622,432 A | 4/1997 | Zicker | |
| 6,003,114 A | 12/1999 | Bachmat | |
| 6,021,624 A | 2/2000 | Richison et al. | |
| 6,033,114 A | 3/2000 | Grimm et al. | |
| 6,060,096 A | 5/2000 | Hanson et al. | |
| 6,100,513 A | 8/2000 | Jackson et al. | |
| RE37,171 E | 5/2001 | Busche et al. | |
| 6,289,889 B1 | 9/2001 | Bell et al. | |
| 6,380,524 B1 | 4/2002 | Keller | |
| 6,396,036 B1 | 5/2002 | Hanson | |
| 6,423,356 B2 | 7/2002 | Richison et al. | |
| 6,485,177 B2 | 11/2002 | Bell | |
| D472,805 S | 4/2003 | Jowett | |
| D473,138 S | 4/2003 | Jowett | |
| D473,139 S | 4/2003 | Jowett | |
| D479,127 S | 9/2003 | Jowett | |
| D479,128 S | 9/2003 | Jowett | |
| 6,630,237 B2 | 10/2003 | Rivett et al. | |
| D485,942 S | 1/2004 | McLeish | |
| 6,726,364 B2 | 4/2004 | Perell et al. | |
| 6,803,113 B2 | 10/2004 | Porter et al. | |
| 6,818,873 B2 | 11/2004 | Savage et al. | |
| 7,014,363 B2 | 3/2006 | Hanson | |
| 7,018,099 B2 | 3/2006 | Caudle | |
| 7,048,125 B2 | 5/2006 | Mize et al. | |
| 7,141,770 B2 | 11/2006 | Zafiroglu et al. | |
| D537,201 S | 2/2007 | McLeish et al. | |
| D564,899 S | 3/2008 | Hardy | |
| 7,381,453 B2 | 6/2008 | Okhai | |
| D584,141 S | 1/2009 | Smith et al. | |
| 7,771,812 B2 | 8/2010 | Beu et al. | |
| 7,943,218 B2 | 5/2011 | Knoerzer et al. | |
| D639,182 S | 6/2011 | Nixon | |
| D640,934 S | 7/2011 | Nixon | |
| D649,710 S | 11/2011 | Mehdizadeh | |
| D655,154 S | 3/2012 | Amos et al. | |
| 8,153,216 B2 * | 4/2012 | Fenn-Barrabaβ et al. | 428/35.7 |
| D662,813 S | 7/2012 | Czamy et al. | |
| D662,814 S | 7/2012 | Cichowski et al. | |
| 2003/0059128 A1 | 3/2003 | Vangedal-Nielsen | |
| 2003/0087015 A1 * | 5/2003 | Wyslotsky | |
| 2003/0124278 A1 * | 7/2003 | Clark | B32B 7/02 |
| | | | 428/35.7 |
| 2004/0023000 A1 * | 2/2004 | Young et al. | 428/138 |
| 2004/0137202 A1 * | 7/2004 | Hamilton et al. | 428/174 |
| 2004/0151811 A1 * | 8/2004 | Mattisson | 426/106 |
| 2004/0226834 A1 * | 11/2004 | Baldwin et al. | 206/204 |
| 2004/0252921 A1 | 12/2004 | Winiarski et al. | |
| 2004/0267223 A1 * | 12/2004 | Etchells | 604/385.01 |
| 2005/0106291 A1 * | 5/2005 | Kawashima | B65B 31/00 |
| | | | 426/106 |
| 2005/0255200 A1 * | 11/2005 | Takahagi | B65D 75/008 |
| | | | 426/113 |
| 2006/0255055 A1 * | 11/2006 | Mulder | B65D 81/2015 |
| | | | 220/592.01 |
| 2007/0048421 A1 * | 3/2007 | Owensby | B65D 31/06 |
| | | | 426/412 |
| 2007/0087096 A1 * | 4/2007 | Mir | B65D 33/01 |
| | | | 426/415 |
| 2007/0145045 A1 * | 6/2007 | Middleton et al. | 219/730 |
| 2008/0276571 A1 * | 11/2008 | Cichowski | 53/467 |
| 2009/0045189 A1 * | 2/2009 | Cormier | B65D 81/3461 |
| | | | 219/727 |
| 2009/0110785 A1 * | 4/2009 | Yasumuro | A47J 36/022 |
| | | | 426/107 |
| 2009/0202756 A1 * | 8/2009 | Jones | B65D 33/01 |
| | | | 428/34.8 |
| 2009/0250466 A1 * | 10/2009 | Fujimura | B65D 77/2052 |
| | | | 220/359.1 |
| 2012/0114808 A1 | 5/2012 | Cichowski et al. | |
| 2014/0255561 A1 | 9/2014 | Perterka et al. | |
| 2014/0295116 A1 | 10/2014 | Berbert | |

FOREIGN PATENT DOCUMENTS

| | | | |
|---|---|---|---|
| DE | 19860473 A1 * | 6/2000 | |
| JP | 2000-62858 | 2/2000 | |
| JP | 2000062858 A * | 2/2000 | |
| JP | 2001-315863 | 11/2001 | |
| JP | 2001315863 A * | 11/2001 | |
| JP | 2006-096367 | 4/2006 | |
| JP | 2006096367 A * | 4/2006 | |
| JP | 2006151395 A * | 6/2006 | |
| JP | 2006151395 A * | 6/2006 | |
| MX | 2013005373 | 5/2012 | |
| WO | 03/051745 | 6/2003 | |
| WO | WO 03051745 A1 * | 6/2003 | |
| WO | 2012/064862 A2 | 5/2012 | |

OTHER PUBLICATIONS

NatureWorks—Additives to Improve Antifog Performance for NatureWorks PLA. Apr. 2, 2009.*

Machine Translation of JP2000-062858 obtained Nov. 15, 2017 (Year: 2017).*

JP2000-062858 Machine Translation—retrieved Dec. 21, 2017.*

(56) References Cited

OTHER PUBLICATIONS

International Search Report mailed May 23, 2012, in PCT/US2011/060001.
Danimezza, Dinner, A Bird's Eye View, Nov. 21, 2012, 6pgs. www.danimezza.com.
Copending U.S. Appl. No. 15/785,194, filed Oct. 16, 2017.

* cited by examiner

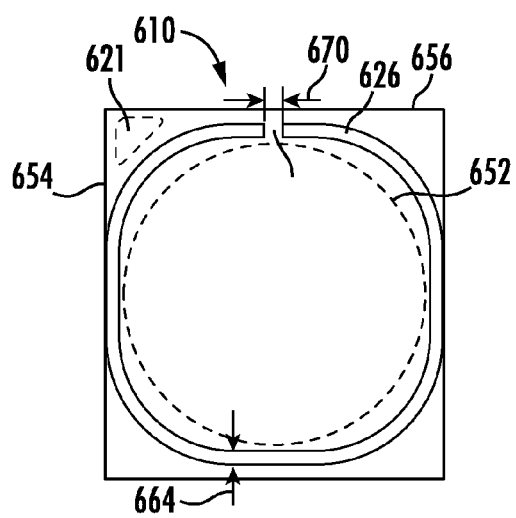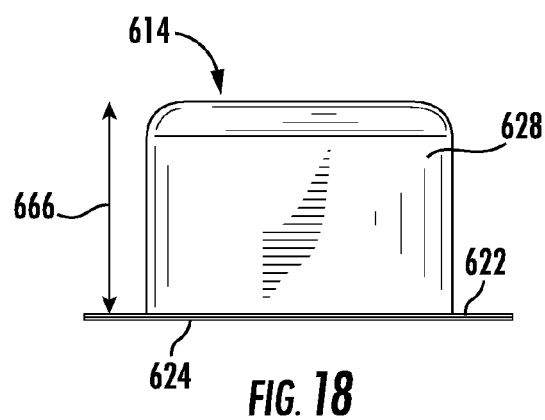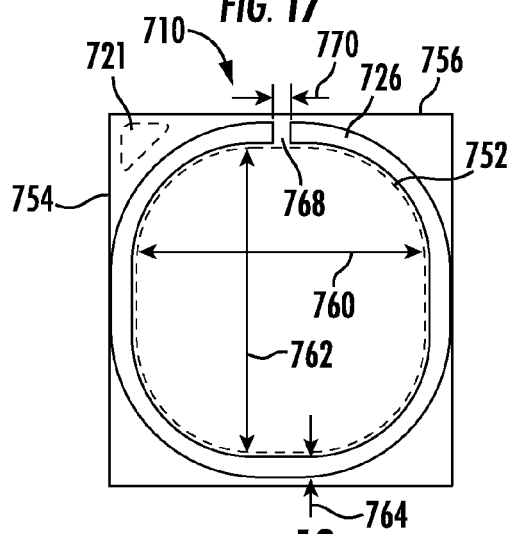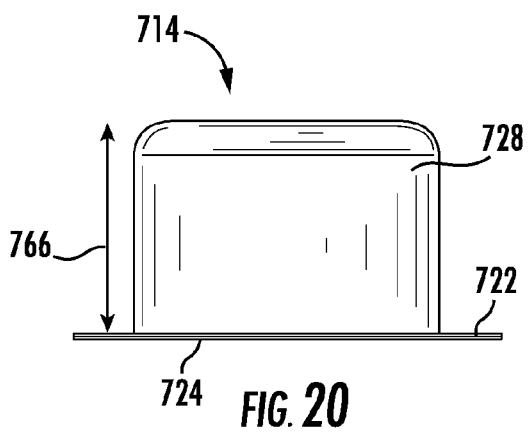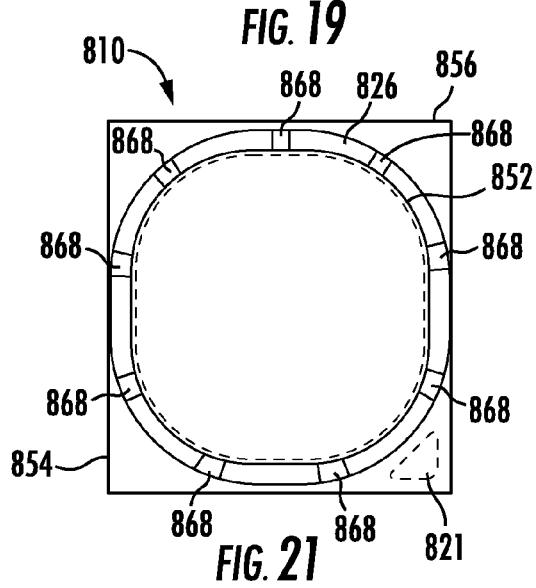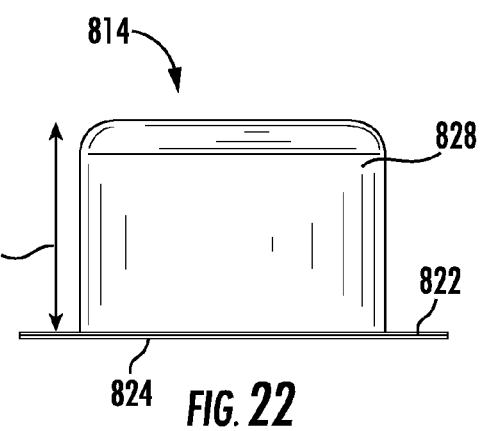

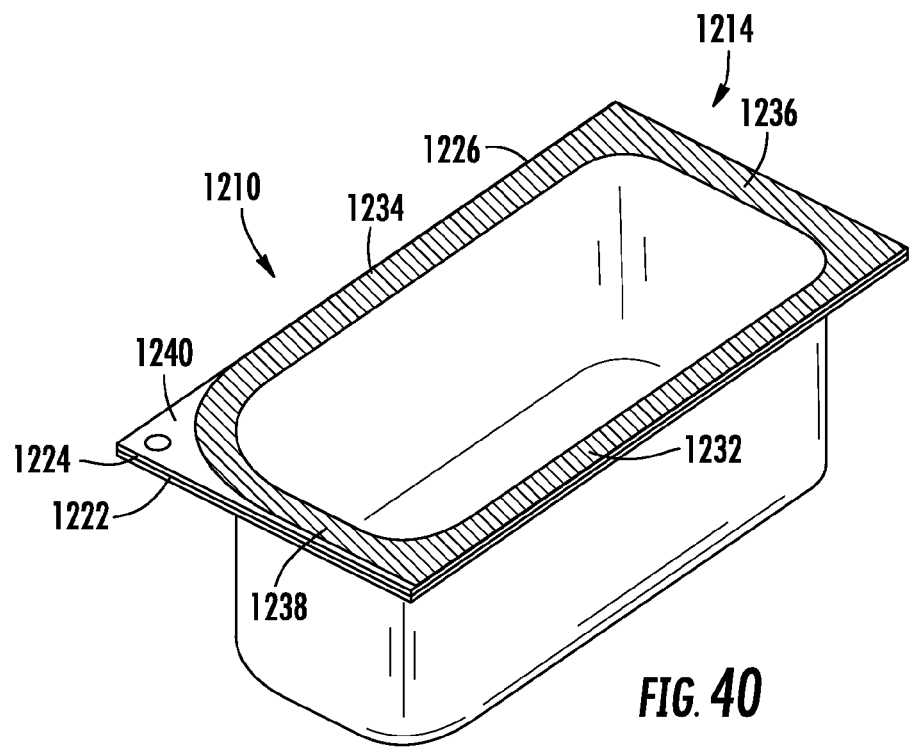
FIG. 40
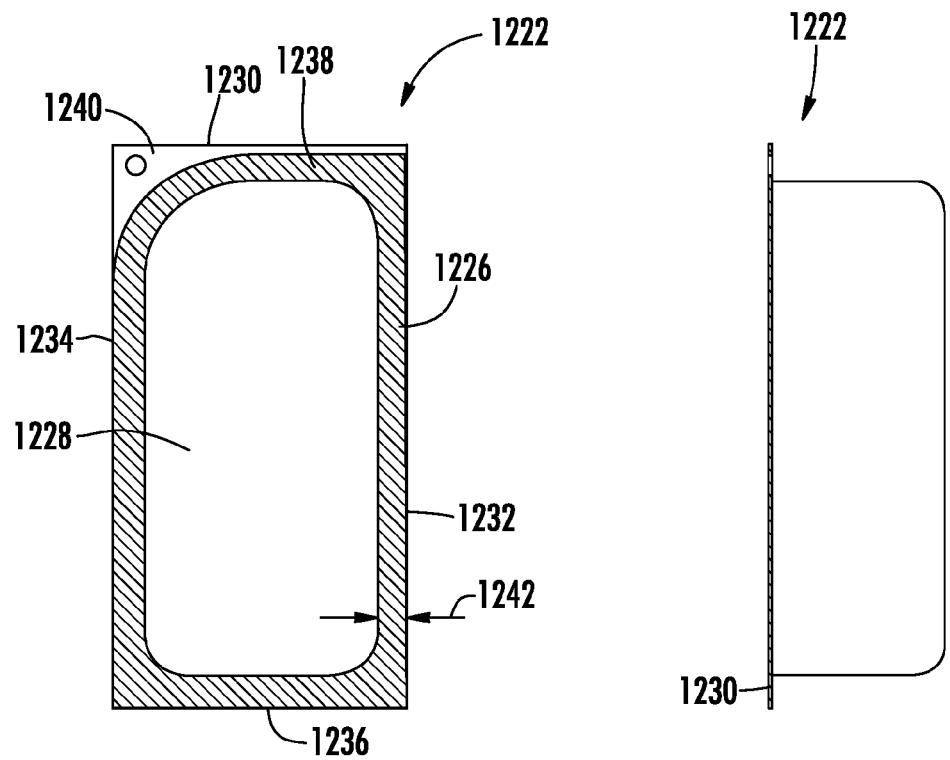
FIG. 41
FIG. 42

PACKAGING FOR FOOD PRODUCT

CROSS REFERENCE TO RELATED PATENT APPLICATIONS

The present application is a National Stage of PCT/US2011/060001 filed Nov. 9, 2011, which is a Continuation-In-Part of U.S. application Ser. No. 12/943,769, filed Nov. 10, 2010, and is a non-provisional of U.S. Provisional Application No. 61/460,750, filed Feb. 24, 2011, and is a non-provisional of U.S. Provisional Application No. 61/453,875, filed Mar. 17, 2011. The present application is also a Continuation-In-Part of U.S. patent application Ser. No. 12/116,109, filed May 6, 2008, all of which are incorporated by reference herein in their entireties.

BACKGROUND

The present disclosure relates generally to the field of packagings for food products, and more specifically, to packagings for food products that provide a more convenient means for preparing (e.g., microwave cooking, etc.) frozen or refrigerated food products for consumption by consumers.

There are many challenges associated with providing consumers with an easy and effective means for preparing food products using microwave ovens. Some of the long unresolved problems associated with microwave cooking include inconveniences to consumers, dryness/sogginess of food products, and uneven cooking of food products, among others.

For example, many packaged food products require users to open a packaging, remove a food product, wrap the food product in a separate covering such as paper towel, etc., and then place the wrapped food product into the microwave. Such additional steps take considerable time and are inconvenient for consumers. Further, food products often release moisture during microwave cooking. Without proper control of the released moisture, the resulting food product may be soggy, or alternatively, overly dry, and undesirable for consumption. Further yet, many food products are unevenly heated when prepared in a microwave oven, due to improper control of moisture and/or other factors.

It would be advantageous to provide an improved packaged food product that addresses and/or overcomes one or more of these challenges by providing a user-friendly, easy-to-use, one-step packaged food product that is also aesthetically pleasing in appearance. As such, various embodiments disclosed herein provide a packaged food product that may be microwaveably cooked in a "one-step" fashion, and that includes, among other features, venting and moisture absorption features to control the humidity within the packaging and provide for an optimal moisture content of multi-component food products.

SUMMARY

One embodiment relates to a packaged food product comprising a bottom receptacle having a lower portion defining an interior and an upper portion extending about the upper periphery of the interior; a food product provided within the interior; a top film sealed to the upper portion of the bottom receptacle via a seal portion extending substantially along the upper periphery of the interior and comprising at least one substantially straight side; wherein the seal portion is configured to release steam at approximately the midpoint of the substantially straight side of the seal portion.

Another embodiment relates to a packaged food product comprising a food product; a packaging having an interior containing the food product, the packaging comprising a first film defining a recess to receive the food product, the first film having an anti-fog treatment applied to at least a portion of the recess, the first film configured to define a space between the food product and the first film and receive heated water vapor released from the food product during heating of the food product; and a second film releasably sealed to the first film, the second film comprising an absorbent layer configured to absorb moisture released from the food product; and at least one vent portion configured to relieve steam pressure from the interior during heating of the food product.

Another embodiment relates to a package for food products, the packaging comprising a packaging having an interior configured to receive the food product, the packaging comprising a first film defining a recess configured to receive the food product and having an anti-fog treatment applied to at least a portion of the recess, the first film configured to permit steam to travel in a space between the food product and the first film during heating of the food product; and a second film configured to be releasably sealed to the first film, the second film comprising an absorbent layer configured to face the food product to absorb moisture released from the food product during heating of the food product; and at least one vent portion configured to release steam from the interior during heating of the food product.

Another embodiment relates to a packaged food product comprising a multi-component food product; a packaging, the packaging having an interior containing the food product, the packaging comprising: a first film, the first film comprising an anti-fog layer provided as part of the first film; and a second film releasably sealed to the first film, the second film comprising an absorbent layer facing the food product and configured to absorb moisture released from the food product; a middle layer at least partially adhered to the absorbent layer; and an outer layer provided adjacent the middle layer; wherein the packaging is configured to provide a space between the first film and the food product through which steam released from the food product may travel during heating of the food product.

BRIEF DESCRIPTION OF THE DRAWINGS

FIG. 17 is a top view of a packaged food product according to an exemplary embodiment.

FIG. 18 is a side view of the packaged food product of FIG. 17.

FIG. 19 is a top view of a packaged food product according to an exemplary embodiment.

FIG. 20 is a side view of the packaged food product of FIG. 19.

FIG. 21 is a top view of a packaged food product according to an exemplary embodiment.

FIG. 22 is a side view of the packaged food product of FIG. 21.

FIG. 40 is a perspective view of a packaged food product according to another exemplary embodiment.

FIG. 41 is a top view of a portion of the packaged food product of FIG. 40 according to an exemplary embodiment.

FIG. 42 is a side view of a portion of the packaged food product of FIG. 40 according to an exemplary embodiment.

DETAILED DESCRIPTION OF EXEMPLARY EMBODIMENTS

Figure 1:
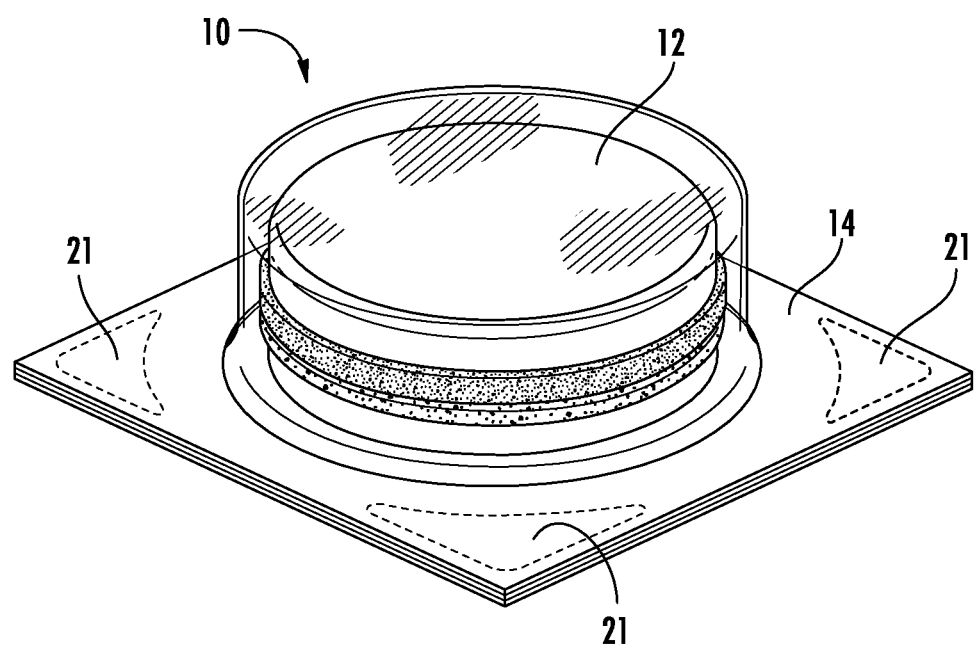
FIG. 1 is a perspective view of a packaged food product according to an exemplary embodiment.

Referring to FIG. 1, a packaged food product 10 (e.g., a breakfast product, a snack product, etc.) is shown according to an exemplary embodiment. Packaged food product 10 may be any of a variety of packaged food products, including, but not limited to, breakfast items such as breakfast sandwiches, etc., lunch items such as lunch sandwiches, etc., dinner items, snack portions, and the like. As shown in FIG. 1, packaged food product 10 includes a food product 12 provided within the interior of packaging 14. Food product 12 may naturally contain moisture that is released when food product 12 is heated as a result of undergoing a cooking process (e.g., microwave cooking, etc.).

Figure 2:
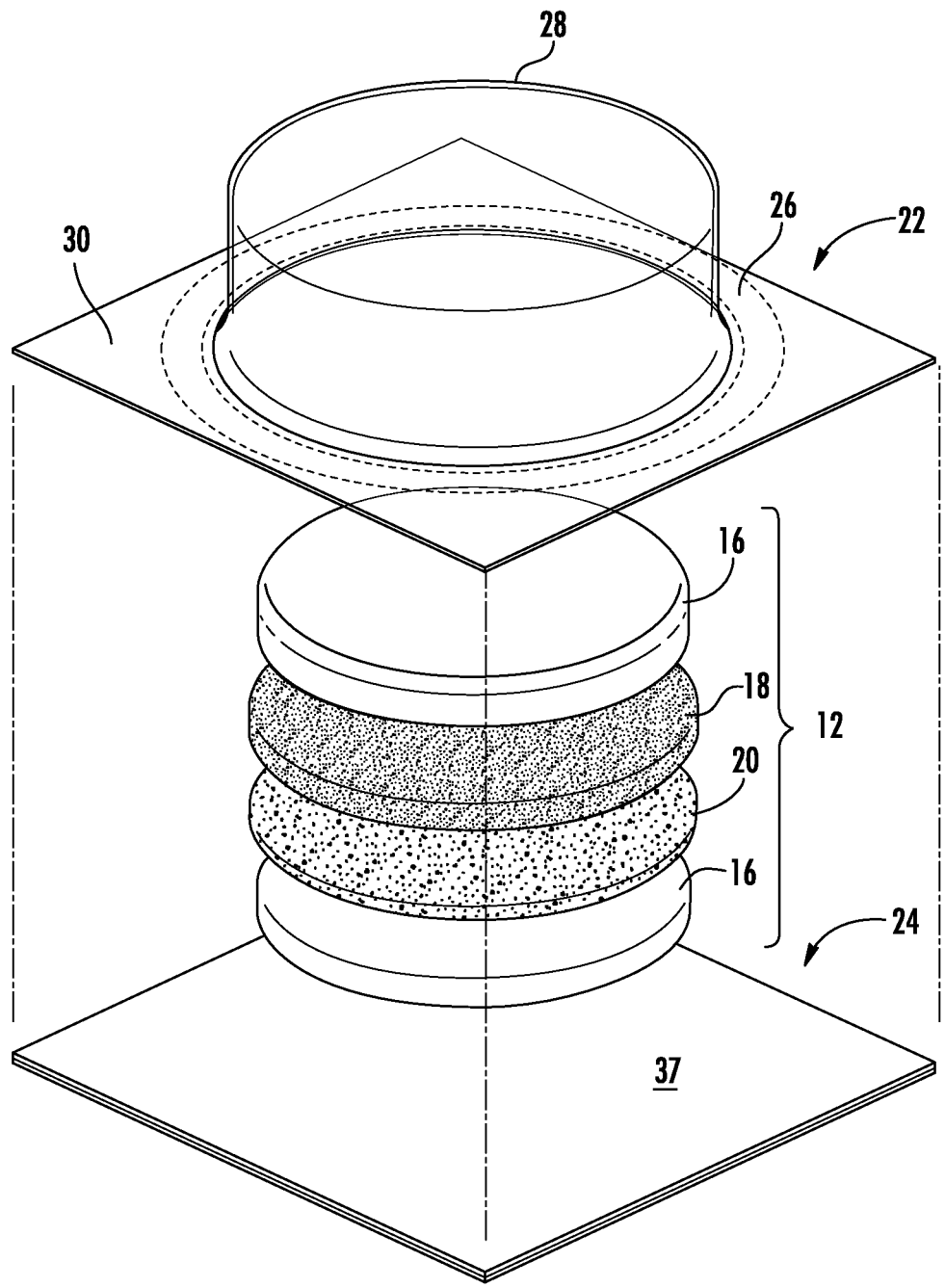
FIG. 2 is an exploded perspective view of the packaged food product of FIG. 1 according to an exemplary embodiment.

Referring to FIGS. 1 and 2, according to an exemplary embodiment, food product 12 is a multi-component food product and includes a plurality of physically separate food components shown as components 16, 18, and 20. For example, in some embodiments, food product 12 may be a breakfast sandwich, such that component 16 may be one or more pieces of biscuit, bun, or similar bread item, component 18 may be a sausage, bacon, or other meat item, and component 20 may be a cheese, sauce, or other topping item. According to various other embodiments, food product 12 may be any of a wide variety of other products, including a lunch sandwich, a snack item, etc. As such, components 16, 18, and 20 may be any of a variety of different components. According to yet other embodiments, food product 12 may include fewer or more components than those shown in FIG. 2 (e.g., a single food component, two food components, four or more food components, etc.)

Further, while in some embodiments food product 12 may be intended to be sold to consumers in a frozen state, in other embodiments food product 12 may be intended to be sold to consumers in a refrigerated or other state. Thus, the embodiments herein may extend to preparing packaged food products having food products in either a frozen or refrigerated state.

According to one embodiment, packaging 14 includes a first film 22 (e.g., a top film or portion, a formed portion, a forming film, a sheet, etc.) and a second film 24 (e.g., a second film or portion, a flat portion, a non-forming film, a sheet, etc.). First and/or second films (also called sheets) 22, 24 may be formed using any suitable process, including a vacuum-forming process, a flow-wrapping process, etc. First film 22 includes a recess 28 (e.g., a pocket, receptacle, formed portion, etc.) and a generally flat portion 30 extending about recess 28. As discussed in greater detail below, in one embodiment, recess 28 is sized to provide a space, or gap 42 (e.g., "a steam dome") about food product 12 when food product 12 is heated in a microwave oven. First film 22 may be made from a semi-rigid film material, such as polyesters (e.g., amorphous polyethylene terephthalate (APET), polyethylene terephthalate (PETG), etc.), polyvinyl chloride (PVC), polypropylene (PP) or reduced density PP, high impact polystyrene, and the like. As such, first film 22 may have sufficient rigidity to support food product 12 after heating and during consumption of food product 12 (e.g., after removal of second film 24 from first film 22). In other embodiments, first film 22 may be made from a variety of other materials, including various polymer or other materials.

Figure 3:
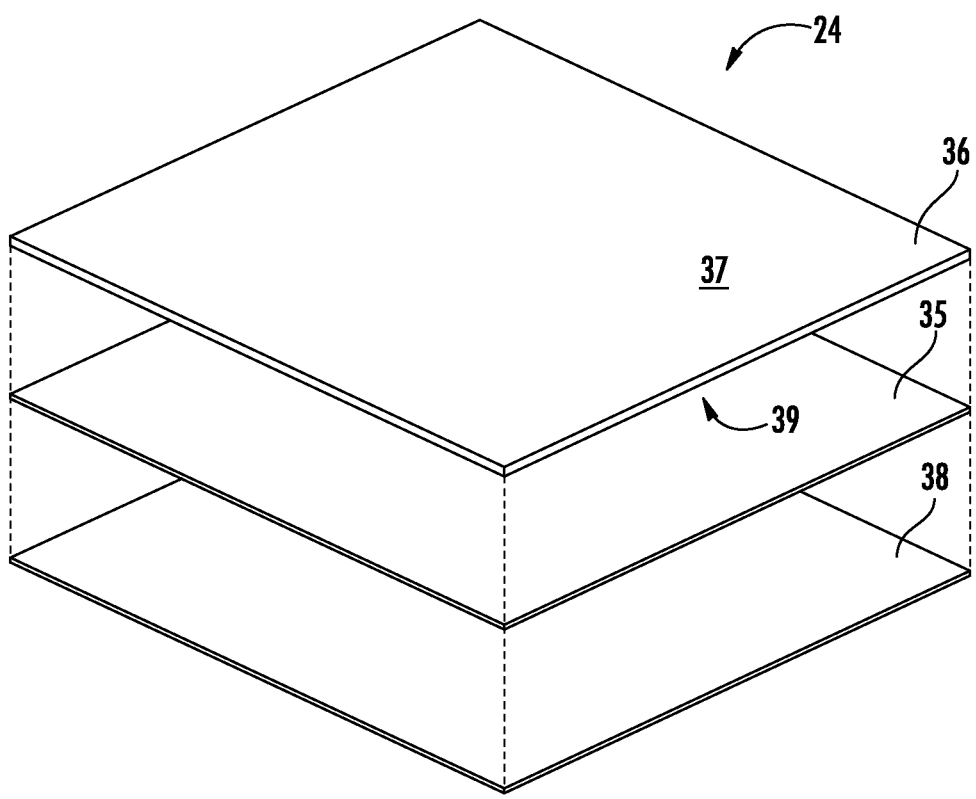
FIG. 3 is an exploded view of a film used in the packaged food product of FIG. 1 according to an exemplary embodiment.
Figure 4:
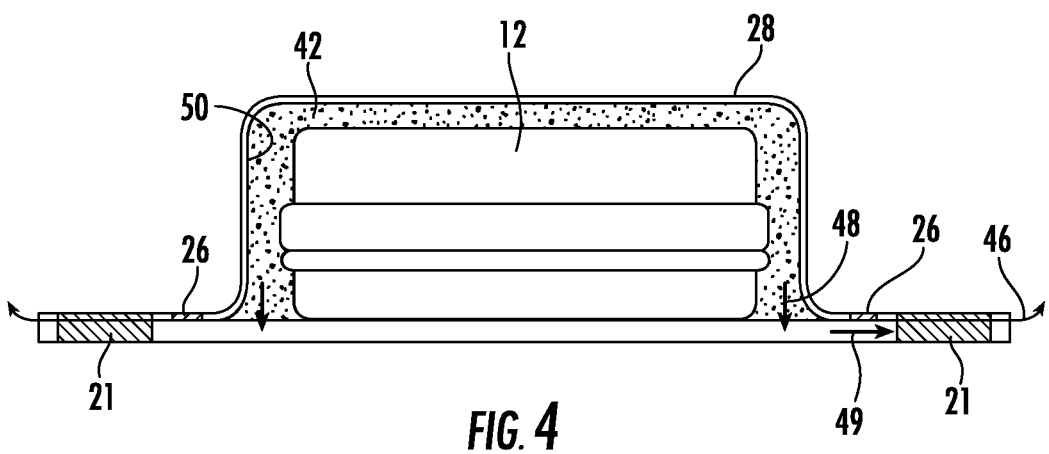
FIG. 4 is a cross-section side view of the packaged food product of FIG. 1 according to an exemplary embodiment.

Referring now to FIGS. 2-4, second film 24 is a generally flat film. According to an exemplary embodiment, second film 24 includes an absorbent layer configured to absorb at least a portion of the moisture released from food product 12 during heating of food product 12 (e.g., such that liquids, etc. may travel along a path such as that indicated by arrows 48, 49 shown in FIG. 4). For example, as shown in FIG. 3, second film 24 may include an absorbent layer 36 (e.g., a paper material, etc.). In one embodiment, second film 24 may be a substantially rigid film. In other embodiments, part or all of second film 24 may be a semi-rigid or flexible film.

Referring to FIG. 3, according to an exemplary embodiment, second film 24 is a laminated film having different layers of material laminated together. For example, as shown in FIG. 3, second film 24 may include absorbent layer 36 (e.g., a first layer, an absorbent layer, a paper-based layer, etc.), a middle layer 35 (e.g., an adhesive layer, a second layer, etc.) and an outer layer 38 (e.g., a third layer, a plastic layer, an outer barrier, etc.). Layers 35, 36, 38 may be laminated (e.g., bonded, sealed, adhered, coupled, etc.) together using any suitable methods. According to an exemplary embodiment, absorbent layer 36 includes an inner-facing cellulose side 37 (e.g., a paper-based side) and an outer-facing polypropylene side 39 (e.g., a polymer-based side). Middle layer 35 may be a polyethylene adhesive or similar material. Outer layer 38 may be a thermoplastic polymer such as oriented polyethylene terephthalate (e.g., a 48 gauge OPET material, etc.) or similar material.

According to one embodiment, first film 22 and second film 24 are sealed by way of melting a portion of absorbent layer 36, for example, during a heat sealing process. For example, absorbent layer 36 may include an inner-facing paper-based layer that also includes polypropylene fibers. As such, first and second films 22, 24 may be heat sealed together (e.g., at seal portion 26) such that the polypropylene fibers present in absorbent layer 36 at least partially melt during the heat sealing process, thereby bonding first and second films 22, 24 together. In sealing films 22 and 24, the seal is formed through the paper-based layer of absorbent layer 36 and with the polypropylene material. The strength of the seal may in some embodiments be varied by changing the paper content of the absorbent layer, as paper fibers tend to degrade the strength of the seal.

According to one embodiment, absorbent layer 36 may be positioned such that absorbent layer 36 faces food product 12. According to other embodiments, one or both of layers 35, 38 may be omitted from second film 24, such that absorbent layer 36 may act as both an inner and/or outer layer for second film 24. Absorbent layer 36 is configured to absorb moisture (e.g., heated water vapor, steam, liquids such as water, oils, grease, etc.) released from food product 12 during heating (e.g., exposure to microwave energy) of food product 12. As such, absorbent layer 36 acts to control the moisture content of food product 12 and prevent food product 12 from becoming too soggy (due to excessive moisture) or too dry (due to lack of moisture). In one embodiment, absorbent layer 36 may be or include an absorbent paper material, such as cellulose. In other embodiments, absorbent layer 36 may be or include a variety of other materials.

According to one embodiment, outer layer 38 is provided to an opposite side of absorbent layer 36 from food product 12. Outer layer 38 acts as an outer barrier for packaging 14 and prevents unwanted moisture, gases, and other products from entering/exiting packaging 14. In one embodiment, outer layer 38 is or includes a plastic material, such as 48 gauge OPET. In other embodiments, outer layer 38 may be or include a variety of other materials.

Referring further to FIGS. 1-4, according to an exemplary embodiment, first film 22 is sealed (e.g., releasably sealed and/or resealably sealed, coupled, etc.) to second film 24 along a seal portion 26 (see FIGS. 2 and 4) such that after heating of packaged food product 10, second film 24 may be removed from first film 22, providing consumers access to food product 12. Food product 12 is contained with the interior of packaging 14 formed by first and second films 22, 24. Seal portion 26 may include any of a number of seal types, including heat sealing, adhesives, ultrasonic welding, and the like. In one embodiment, some or all of seal 26 is a non-hermetic heat seal that permits passage of fluids (e.g., steam, moisture, etc.) through seal 26. In some embodiments, seal portion 26 may extend around the entire periphery of recess 28 of first film 22. As discussed below, certain portions of seal portion 26 may provide a self-venting feature for packaged food product 10 to provide for the release of steam during heating of food product 12. Seal portion 26 can be called a bonding region. As further discussed below, seal portion 26 can include one or more seals. FIG. 2 shows an exemplary embodiment of seal portion 26 being ring shaped. The inner perimeter of the ring can define a first or inner end of seal portion 26. The outer perimeter of the ring can define a second or outer end of seal portion 26.

Referring now to FIG. 4, according to an exemplary embodiment, packaging 14 is configured to provide a "steam dome" around portions of food product 12 during heating of food product 12. For example, as shown in FIG. 4, a steam dome shown as gap or space 42 is provided between food product 12 and recess 28 of first film 22. As food product 12 is heated, steam is generated and "inflates" first film 22. Space 42 provides an area through which this steam is able to travel and continue to provide heat to food product 12 (e.g., acting as an insulator to keep the food product heated longer by conducting heat) and to provide for "steam-assisted cooking," or "steam-conductive heating." This may serve to equilibrate the moisture within packaging 14 and ensure faster and more even cooking of food product 12 relative to more traditional means of microwave cooking, where steam is simply released into the interior of the microwave oven. Further, providing space 42 also permits moisture to uniformly re-enter food product 12 to avoid over-drying of food product 12, resulting in an optimal moisture content food product 12.

According to some embodiments, an anti-fog layer feature or layer 50 (e.g., an anti-fog treatment or feature, etc.) may be provided as part of or on the inner surface of first film 22. Anti-fog layer 50 may be a separate layer of material, or may be provided as an integral part of first film 22. For example, in some embodiments, anti-fog material may be added to a resin (e.g., as resin chips or the like) used to make one or more films of packaging 14. Providing an anti-fog surface on first film 22 eliminates and/or prevents the formation of water beads or droplets that may otherwise form on first film 22 during heating of food product 12. The anti-fog treatment is not being used to merely resist fog from appearing on the film, but to cause water to run or drain from the film toward the absorbent layer (i.e., to "pass" or guide water toward the absorbent layer).

Furthermore, anti-fog layer 50 resists fogging (clouding, discoloring, etc.) of the films due to extreme or sudden temperature changes. An anti-fog surface also maintains an aesthetically appealing visual appearance to packaged food product 10 prior to, during, and after heating of packaged food product 10, as the packaging does not "fog up" (e.g., the packaging remains substantially transparent if a transparent packaging material is used). According to various alternative embodiments, an anti-fog treatment may be provided on or as a part of one or both of first film 22 and second film 24. In one embodiment, as water condenses on the films, the anti-fog treatment causes the water to run (e.g., drain, flow, wick, etc.) toward absorbent layer 36, where it may remain and/or be regenerated back into steam (i.e., to "pass" or guide water toward the absorbent layer). As a result of the anti-fog treatment, rather than water beads or droplets forming, the anti-fog treatment reduces the surfaces tension of the film (i.e., "wetting" the film) such that only a fine layer of water forms (e.g., a "non-scattering" film of water) and runs down the sides of the film.

As indicated earlier, one or more vent portions may be provided as part of packaging 14. For example, seal portion 26 may provide a self-venting feature for packaging 14, such that one or more portions of seal portion 26 (e.g., the interface between first and second films 22, 24) may be configured to permit a desired amount of steam or moisture to escape from the interior of packaging 14 during heating of food product 12 (e.g., along a path indicated by arrow 46 shown in FIG. 4). In some embodiments, one or more portions of seal portion 26 may be "weakened" to provide venting of steam and/or moisture. Furthermore, first film 22 may be shaped or sized to direct moisture to weakened portions of seal portion 26. For example, first film 22 may include one or more flutes (e.g., corrugations, etc.) or other features to direct moisture to specific portions of seal portion 26.

In yet other embodiments, packaging 14 may be configured such that a user may "peel back" a portion of first film 22 from second film 24 (e.g., using an "easy peel" feature) to provide an opening through which steam may escape from the interior of packaging 14 during heating of food product 12. For example, due to the presence of paper fibers (e.g., non-woven, porous paper) in the films, seal portion 26 may be weakened as the moisture (e.g., steam) escaping from the package reduces the tensile strength of the paper fibers. According to yet further embodiments, one or more vent portions may be configured to provide venting only upon heating of packaged food product 10 (e.g., such that the vent portions are otherwise substantially impermeable to liquids and/or gases).

In some embodiments, excess moisture may be directed through specific portions of seal portion 26 to areas of packaging 14 outside of seal portion 26. For example, weakened portions or channels may be used to direct moisture to areas 21 (also called pockets) of packaging 14 to take advantage of the absorbency of those areas that may otherwise not by utilized. Weakened portions of seal 26 may be provided in a variety of ways, including narrowing the "width" of the seal and/or reducing the "thickness" of the seal. Other ways of providing weakened areas of seal 26 may be utilized according to various other embodiments. For example, various parameters of packaging machinery (e.g., pressure, temperature, dwell time, etc.) may be varied in order to provide a seal of a desired strength (e.g., a "controllable seal" formed through "fiber intervention," where the presence of papers fibers in the seal area can be increased or decreased to control the strength of the seal).

As shown in FIG. 1, areas 21 may be provided in one or more of the "corners" of packaging 14. According to various alternative embodiments, the location and number of areas 21 may be varied to suit a particular packaging configuration (e.g., variations in size, shape, etc.). In some embodiments, a scented material may be provided in areas 21, and the scented material may be activated by heat and/or moisture, such that as the food product is prepared and moisture and/or heat travels to areas 21, a scent (e.g., a fresh bread scent, a sage sausage scent, etc.) may be activated and/or released. In one embodiment, the scented material is provided in one or more absorbent layers of the packaging, although the scented material may be provided using different methods according various other embodiments. As indicated above, the scented material may release a scent (e.g., a fresh bread scent) that is normally associated by consumers with the food product (e.g., a bread food product) being prepared, to enhance the consumer experience. The scent may be activated by the contact with the moisture, the heat, air, or the like or combinations thereof.

In combination with the absorbent features of second film 24, the venting features of packaging 14 are intended to control the humidity and/or temperature and equilibrate the moisture content (e.g., maintain a consistent, even, or desired level of moisture) within the interior of packaging 14 during heating of food product 12 such that, for example, the humidity level within the interior of packaging 14 remains at or below a predetermined level during the dynamic heating cycle of food product 12. The absorbent layer acts as a "buffer" or "moisture sink" to control the amount of steam/moisture within the packaging. For example, one or more venting features of packaging 14 may be configured to "delay" any venting of steam or moisture until a predetermined temperature, pressure, or moisture content is reached within the interior of packaging 14. This may help to provide for faster cooking cycles and ensure a proper moisture content for food product 12 and avoid an over-dry or soggy food product.

In order to prepare the packaged food product of the present disclosure, a consumer may first simply place the packaged food product in a microwave oven, with the "flat" portion (e.g., second film 24) facing downward (to permit formation of the "stream dome"). The consumer may then heat the packaged food product in the microwave oven for an appropriate amount of time (e.g., 1 minute, 2 minutes, etc.). During heating, steam may be released from the food product and form a "steam dome" around the exterior of the food product (e.g., inflating first film 22 to define space 42). A portion of the moisture from the steam may be reabsorbed by the food product, a portion may be vented to the outside environment, and a portion may be absorbed by the absorbent layer of the packaging. Additional moisture (e.g., liquids such as oils, grease, etc.) released by the food product may further be absorbed by the absorbent layer of the packaging. The food product construction; the moisture content of the food product; the size of space 42; the type, amount of, and performance of the absorbent layer; and the size, location, and performance of the vent portions are balanced to provide the proper level of moisture within packaging 14 during preparation of food product 12. Upon completion of the heating cycle, the consumer may simply remove the packaged food product from the microwave oven, remove the flat film (e.g. second film 24) and consume the food product directly from the remaining packaging. If desired, a portion of the packaging may be used to hold the food product during consumption.

Figure 5:
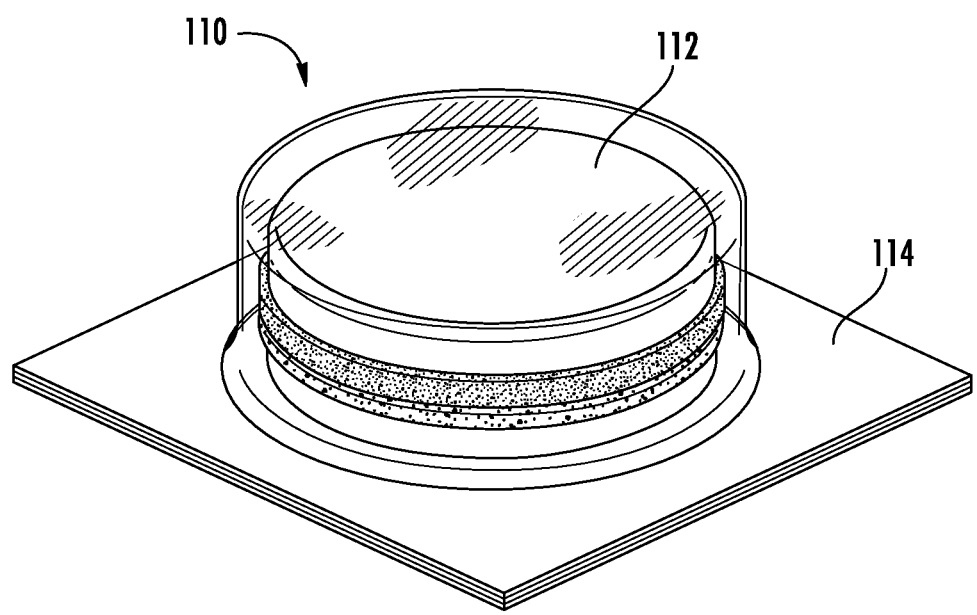
FIG. 5 is a perspective view of a packaged food product according to an alternative exemplary embodiment.

Referring now to FIGS. 5-8, a packaged food product 110 (e.g., a breakfast product, a snack product, etc.) is shown according to an alternative exemplary embodiment. Packaged food product 110 may be similar to packaged food product 10 and include any of a variety of packaged food products, including, but not limited to, breakfast items such as breakfast sandwiches, etc., lunch items such as lunch sandwiches, etc., dinner items, snack portions, and the like. As shown in FIG. 5, packaged food product 110 includes a food product 112 provided within the interior of packaging 114.

Figure 6:
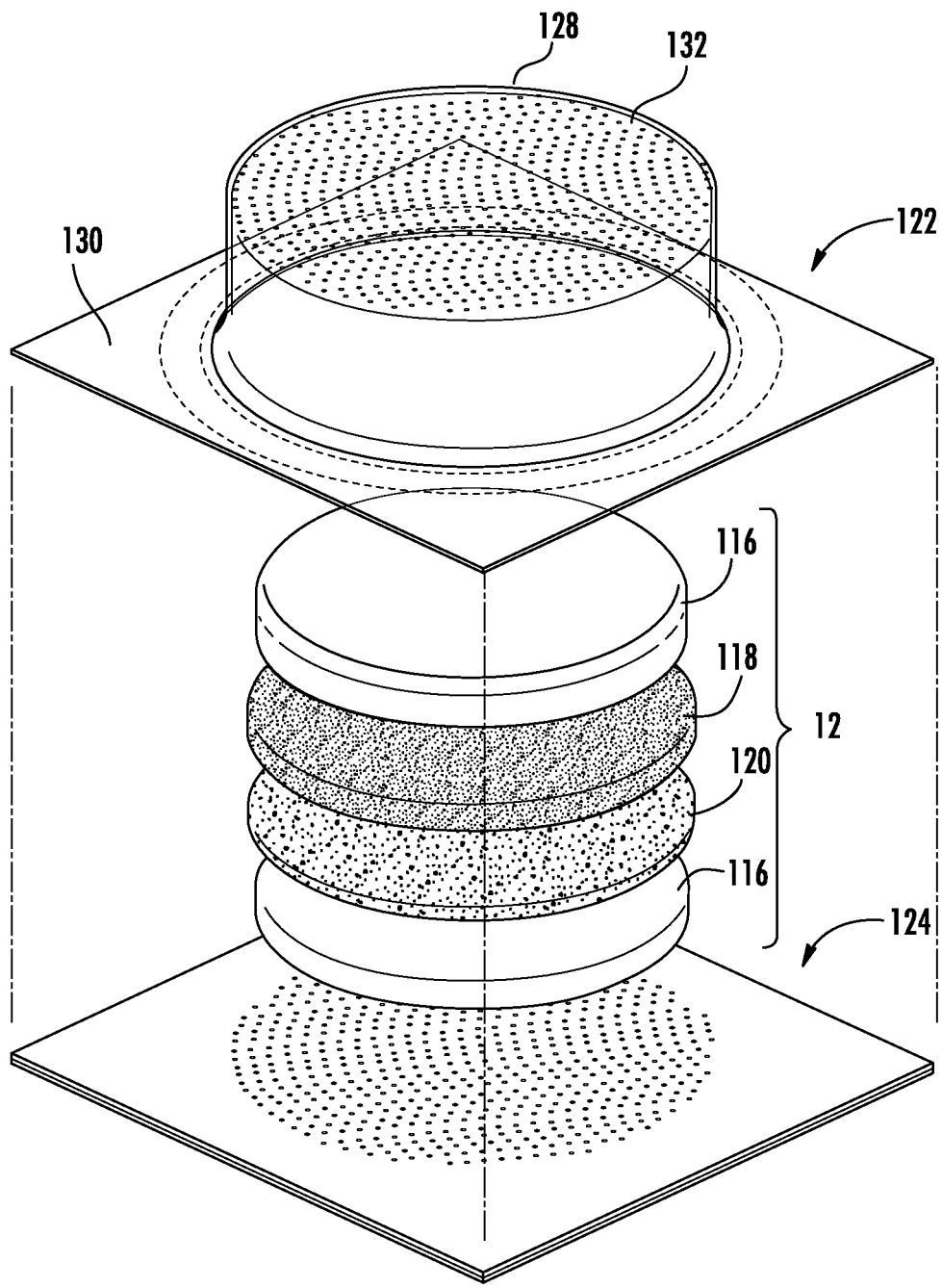
FIG. 6 is an exploded perspective view of the packaged food product of FIG. 5 according to an exemplary embodiment.

Referring to FIGS. 5 and 6, according to an exemplary embodiment, food product 112 is a multi-component food product and includes a plurality of physically separate food components shown as components 116, 118, and 120. For example, in some embodiments, food product 112 may be a breakfast sandwich, such that component 116 may be one or more pieces of biscuit, bun, or similar bread item, component 118 may be a sausage, bacon, or other meat item, and component 120 may be a cheese, sauce, or other topping item. According to various other embodiments, food product 112 may be any of a wide variety of other products, including a lunch sandwich, a snack item, etc. As such, components 116, 118, and 120 may be any of a variety of different components. According to yet other embodiments, food product 112 may include fewer or more components than those shown in FIG. 6 (e.g., a single food component, two food components, four or more food components, etc.)

Further, while in some embodiments food product 112 may be intended to be sold to consumers in a frozen state, in other embodiments food product 112 may be intended to be sold to consumers in a refrigerated or other state. Thus, the embodiments herein may extend to preparing packaged food products having food products in either a frozen or refrigerated state.

According to one embodiment, packaging 140 includes a first film 122 (e.g., a top film or portion, a formed portion, etc.) and a second film 124 (e.g., a second film or portion, a flat portion, etc.). First and second films 122, 124 may be formed using any suitable process, including a vacuum-forming process, a flow-wrapping process, etc. First film 122 includes a recess 128 (e.g., a pocket, receptacle, formed portion, etc.) and a generally flat portion 130 extending about recess 128. As discussed in greater detail below, in one embodiment, recess 128 is sized to provide a space, or gap 142 (e.g., "a steam dome") about food product 112 when food product 112 is heated in a microwave oven. First film 122 may be made from a semi-rigid film material, such as polyesters (e.g., amorphous polyethylene terephthalate (APET), polyethylene terephthalate (PETG), etc.), polyvinyl chloride (PVC), polypropylene (PP) or reduced density PP, high impact polystyrene, and the like. As such, first film 122 may have sufficient rigidity to support food product 112 after heating and during consumption of food product 112 (e.g., after removal of second film 124 from first film 122). In other embodiments, first film 122 may be made from a variety of other materials, including various polymer or other materials.

Figure 7:
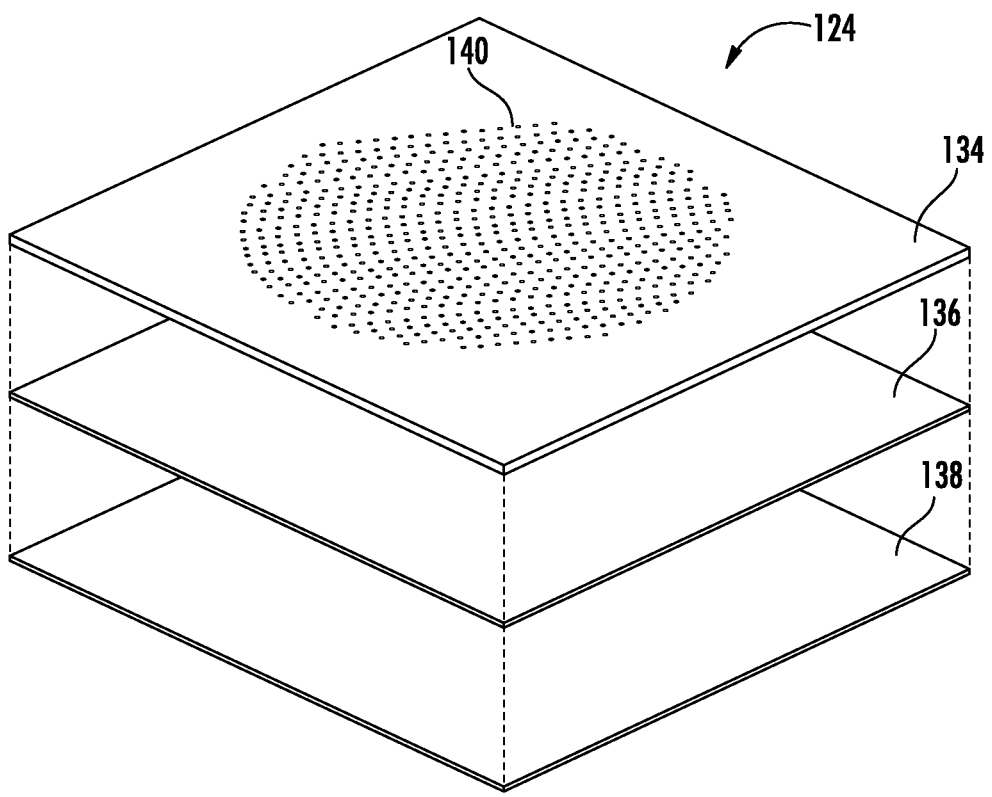
FIG. 7 is an exploded view of a film used in the packaged food product of FIG. 5 according to an exemplary embodiment.
Figure 8:
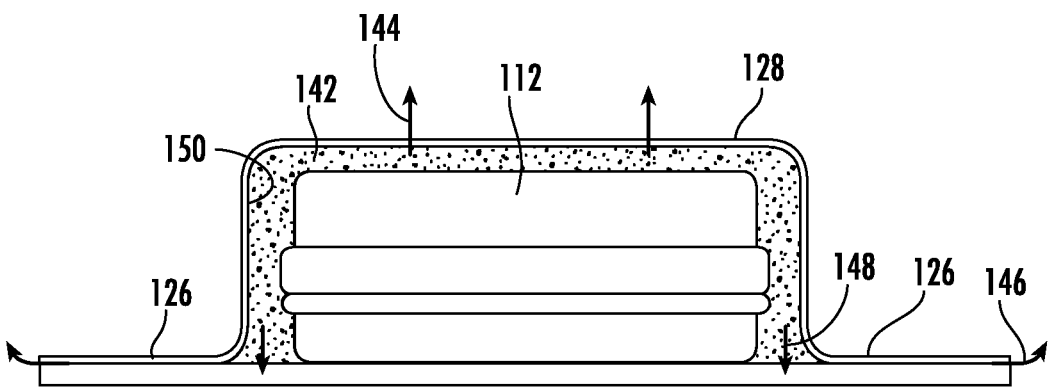
FIG. 8 is a cross-section side view of the packaged food product of FIG. 5 according to an exemplary embodiment.

Referring now to FIGS. 6-8, second film 124 is a generally flat film. According to an exemplary embodiment, second film 124 includes an absorbent layer configured to absorb at least a portion of the moisture released from food product 112 during heating of food product 112 (e.g., such that liquids, etc. may travel along a path such as that indicated by arrow 148 shown in FIG. 8). For example, as shown in FIG. 7, second film 124 may include an absorbent layer 136 (e.g., a paper material, etc.). In one embodiment, second film 124 may be a substantially rigid film. In other embodiments, part or all of second film 124 may be a semi-rigid or flexible film.

Referring to FIG. 7, according to an exemplary embodiment, second film 124 is a laminated film having different layers of material laminated together. For example, as shown in FIG. 7, second film 124 may include an inner layer 134 (e.g., a first layer, a plastic layer, a perforated layer, etc.), absorbent layer 136 (e.g., a second layer, an absorbent layer, a paper-based layer, etc.), and an outer layer 138 (e.g., a third layer, a plastic layer, an outer barrier, etc.). Layers 134, 136, 138 may be laminated (e.g., bonded, sealed, adhered, coupled, etc.) together using any suitable methods.

According to one embodiment, inner layer 134 is positioned such that inner layer 134 faces food product 112. In some embodiments, inner layer 134 may include one or more perforations 140 (e.g., slits, slots, apertures, microperforations, etc.) that are configured to permit moisture released from food product 112 during heating of food product 112 to travel through inner layer 134 to be absorbed by absorbent layer 136. Perforations 140 may be provided in any desired configuration, with any of a variety of sizes, shapes, etc., and the configuration of perforations 140 may be based on the food product to be contained within packaging 140. In one embodiment, inner layer 134 may be made from a food-grade plastic material, such as polyethylene (PE). In other embodiments, inner layer 134 may be or include a variety of other materials.

According to one embodiment, absorbent layer 136 may be provided between inner layer 134 and outer layer 138. According to other embodiments, one or both of layers 134, 138 may be omitted from second film 124, such that absorbent layer 136 may also act as an inner and/or outer layer for second film 124. Absorbent layer 136 is configured to absorb moisture (e.g., liquids such as water, oils, grease, etc.) released from food product 112 during heating of food product 112. As such, absorbent layer 136 acts to control the moisture content of food product 112 and prevent food product 112 from becoming too soggy (due to excessive moisture) or too dry (due to a lack of moisture). In one embodiment, absorbent layer 136 may be or include an absorbent paper material, such as cellulose. In other embodiments, absorbent layer 136 may be or include a variety of other materials. The amount of moisture absorbed by absorbent layer 136 may be controlled at least in part by controlling the configuration (number, size, spacing, etc.) of perforations 140 in inner layer 134.

According to one embodiment, outer layer 138 is provided to an opposite side of absorbent layer 136 from inner layer 134. Outer layer 138 acts as an outer barrier for packaging 114 and prevents unwanted moisture, gases, and other products from entering/exiting packaging 114. In one embodiment, outer layer 138 is or includes a plastic material, such as 48 gauge OPET. In other embodiments, outer layer 138 may be or include a variety of other materials.

Referring further to FIGS. 5-8, according to an exemplary embodiment, first film 122 is sealed (e.g., releasably sealed and/or resealably sealed, coupled, etc.) to second film 124 along a seal portion 126 (see FIGS. 6 and 8) such that after heating of packaged food product 110, second film 124 may be removed from first film 122, providing consumers access to food product 112. Food product 112 is contained with the interior of packaging 114 formed by first and second films 122, 124. Seal portion 126 may include any of a number of seal types, including heat sealing, adhesives, ultrasonic welding, and the like. In some embodiments, seal portion 126 may extend around the entire periphery of recess 128 of first film 122. As discussed below, certain portions of seal portion 126 may provide a self-venting feature for packaged food product 110 to provide for the release of steam during heating of food product 112.

Referring now to FIG. 8, according to an exemplary embodiment, packaging 114 is configured to provide a "steam dome" around portions of food product 112 during heating of food product 112. For example, as shown in FIG. 8, a steam dome shown as gap or space 142 is provided between food product 112 and recess 128 of first film 122. As food product 112 is heated, steam is generated. Space 142 provides an area through which this steam is able to travel and continue to provide heat to food product 112. This may serve to equilibrate the moisture within packaging 114 and ensure faster and more even cooking of food product 112 relative to more traditional means of microwave cooking, where steam is simply released into the interior of the microwave oven. Further, providing space 142 also permits moisture to uniformly re-enter food product 112 to avoid over-drying of food product 112, resulting in an optimal moisture content food product 112.

According to some embodiments, an anti-fog layer 150 (e.g., an anti-fog treatment or feature, etc.) may be provided as part of the inner surface of first film 122. Anti-fog layer 150 may be a separate layer of material, or may be provided as an integral part of first film 122. Providing an anti-fog surface on first film 122 prevents the formation of water beads or droplets that may otherwise form on first film 122 during heating of food product 112. An anti-fog surface also maintains an aesthetically appealing visual appearance to packaged food product 110 prior to, during, and after heating of packaged food product 110. According to various alternative embodiments, an anti-fog treatment may be provided on one or both of first film 122 and second film 124.

As indicated earlier, one or more vent portions may be provided as part of packaging 114. For example, first film 122 may be provided with perforations 132 to permit a desired amount of steam to escape from the interior of packaging 114 during heating of food product 112 (e.g., along a path indicated by arrow 144 in FIG. 8). Perforations 132 may be provided in any of a variety of shapes, sizes, locations, number and so on to suit a particular food product. Alternatively or in addition, seal portion 126 may provide a self-venting feature for packaging 114, such that one or more portions of seal portion 126 (e.g., the interface between first and second films 122, 124) may be configured to permit a desired amount of steam to escape from the interior of packaging 114 during heating of food product 112 (e.g., along a path indicated by arrow 146 shown in FIG. 8).

In yet other embodiments, packaging 114 may be configured such that a user may "peel back" a portion of first film 122 from second film 124 (e.g., using an "easy peel" feature) to provide an opening through which steam may escape from the interior of packaging 114 during heating of food product 112. For example, due to the presence of paper fibers in the films, the seal may be weakened as the moisture (e.g., steam) escaping from the package reduces the tensile strength of the paper fibers. According to yet further embodiments, one or more vent portions may be configured to provide venting only upon heating of packaged food product 110 (e.g., such that the vent portions are otherwise substantially impermeable to liquids and/or gases).

It should be noted that any of the features shown in the embodiments illustrated in FIGS. 5-8 may be used alone or in any number of combinations with the features shown in the embodiments illustrated in FIGS. 1-4. All such features and combinations of features are to be understood to be within the scope of the present disclosure.

In some embodiments, one or both of the top and bottom films may have a structure different than that disclosed herein. For example, one or more portions of the laminated films may be heat sealed, for example, to provide "channels" or "pathways" that direct moisture along portions of the films and/or to "trap" moisture in desired portions of the films. Other variations in the structure of the films disclosed herein may be made according to various other embodiments.

Referring now to FIGS. 9-26, various alternative embodiments of packaged food products are shown. It should be noted that the features of the embodiments shown in any of FIGS. 9-26 may be used alone or in combination with any of the other features of packaged food products discussed herein, including those features discussed with respect to the embodiments shown in FIGS. 1-8. The packaging used will generally depend on the food product being contained therein and the quantity of food items.

Figure 9:
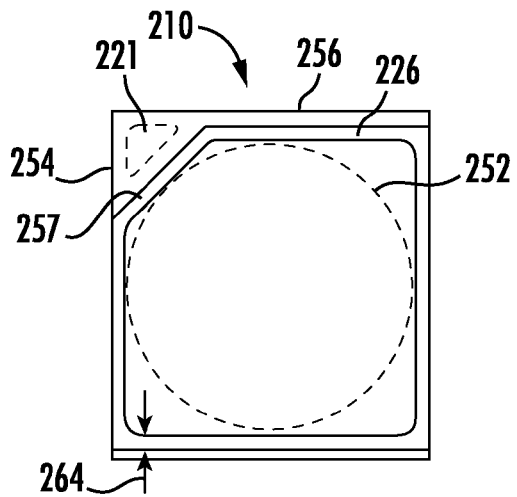
FIG. 9 is a top view of a packaged food product according to an exemplary embodiment.
Figure 10:
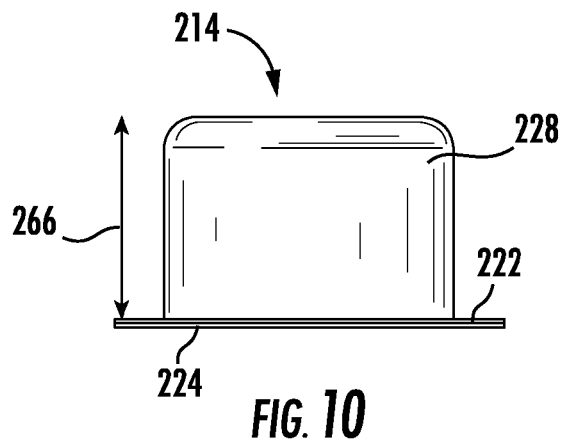
FIG. 10 is a side view of the packaged food product of FIG. 9.

Referring to FIGS. 9-10, a packaged food product 210 is shown according to an exemplary embodiment, and includes a packaging 214 having a first film 222 and a second film 224 sealed together via a seal 226. First film 222 defines a recess, or dome 228, and made from a variety of thin plastic films or laminates. The film may be sufficiently thin and flexible to allow compaction yet protect the food product and perform the desired containment during manufacturing, transportation, heating, and handling by the consumer. Except as otherwise discussed herein, the packaging, films, recess, and seal shown in FIGS. 9-10 may have any or all of the features discussed with respect to FIGS. 1-8 or any of the other embodiments disclosed herein. According to exemplary embodiments, the second film may be square, rectangular, circular, elliptical, elongated, or combinations thereof. As shown in FIG. 9, second film 224 has a planar film having a square or rectangular perimeter. In one embodiment, second film 224 defines a square having sides 254, 256, which may have a variety of dimensions. The sides 254, 256 of second film 224 and height 266 of recess 228 may be any suitable dimension for a particular food product (not shown).

According to an exemplary embodiment, seal 226 may have a width 264 of approximately 4-6 mm. According to other exemplary embodiments, the width of the seal may be based on the desired performance of the seal during heating of the food product. If early venting is desired, the seal width may be reduced. If increased sealing performance to inhibit venting of steam built up within the recess 228 during heating of the food product, the width of the seal may be increased. Seal 226 may generally track the perimeter of second film 224, such as having a generally square shape, and may include an angled corner portion 257 that defines an area 221. Area 221 may provide a graspable tab for a user to peel apart first and second films 222, 224. According to an exemplary embodiment, a there is no bonding between first and second films at area 221 to provide the graspable tab. A portion of area 221 may be bonded to inhibit excessive or the appearance of inadvertent peeling of the films (e.g., within the triangular broken line region in FIG. 9, the circular region in FIG. 40, etc.). According to an exemplary embodiment, the base first film includes a projection (e.g., bump, etc.) extending away from the recess interior in area 221 (or 321, 421, 521, 621, 721, 821, 1240, etc.) to provide a small separation between the first film and the second film so that the first film and the second film can be easily separated by the consumer. One or more portions of seal 226 may extend about the outermost portion of second film 224, while in other embodiments, one or more portions of seal 226 may be inset (a suitable dimension) from the outermost portions of second film 224. According to other embodiments, the seal shown in FIGS. 9-10 and any of the other embodiments herein may have any of a variety of shapes or configurations (e.g., zig-zag, sinusoidal, stepped, etc.) depending on the available space (as determined by the outer dimension and the size of the recess/dome), desired sealing performance, and the like. Also, instead of being formed by a single annular seal, the seal may be formed by a two or more annular seal rings. According to an exemplary embodiment, first and second films may be have a generally rectangular perimeter and a generally circular dome or recess 228, and be bonded together by linear (and substantially rectangular/square) seal 226 (with the exception of portion 257). Such seal 226 extends along the outer area of the films 222, 224. Alternatively, the seal (and outer periphery of the bonded films) may be circular as shown in other embodiments herein. Alternatively, the seal may extend from the outer periphery (whether linear or curved) inward until the first film begins its special separation from the second film to form the recess.

According to an exemplary embodiment, recess 228 may have a generally circular cross section 252 along its height (e.g., cylindrical, etc.). In some embodiments, the perimeter of recess 228 substantially abuts or is adjacent to the interior portion or edge of seal 226. For example, there may be a distance of approximately 1 to 2 mm or less between portions of recess 228 and seal 226. In other embodiments a greater space may be defined between recess 228 and seal 226.

Figure 11:
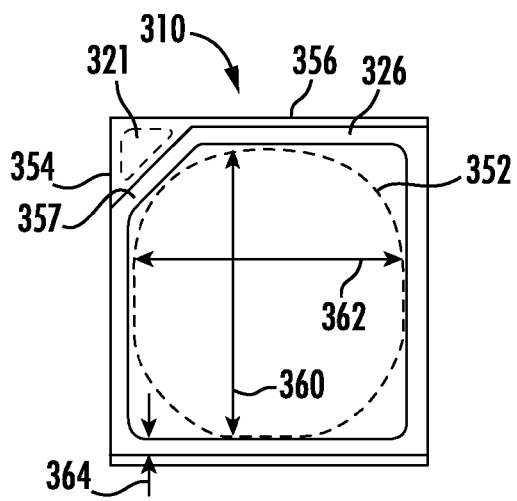
FIG. 11 is a top view of a packaged food product according to an exemplary embodiment.
Figure 12:
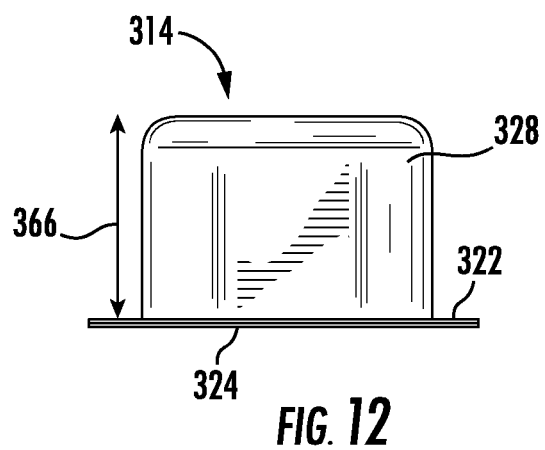
FIG. 12 is a side view of the packaged food product of FIG. 11.

Referring now to FIGS. 11-12, a packaged food product 310 is shown according to an exemplary embodiment, and includes a packaging 314 having a first film 322 and a second film 324 sealed together via a seal 326. First film 322 defines a recess, or dome, 328. Except as otherwise discussed herein, the packaging, films, recess, and seal shown in FIGS. 11-12 may have any or all of the features discussed with respect to FIGS. 1-8 or any of the other embodiments disclosed herein. As shown in FIG. 11, second film 324 may be a planar film having a square or rectangular perimeter. Alternatively, second film 234 may be rectangular, circular, elliptical, elongated, or combinations thereof. In one embodiment, second film 324 defines a rectangle having sides 354, 356 which may have a variety of dimensions. The sides 354, 356 and height 366 of recess 328 may be any suitable dimension for a particular food product (not shown).

According to an exemplary embodiment, seal 326 may have a width 364 of approximately 6-8 mm. According to other exemplary embodiments, the width of the seal may be based on the desired performance of the seal during heating of the food product. If early venting is desired, the seal width may be reduced. If increased sealing performance to inhibit venting of steam built up within the recess 328 during heating of the food product, the width of the seal may be increased. Seal 326 may generally track the perimeter of second film 324, such as having a generally rectangular shape, and may include an angled corner portion 357 that defines an area 321. Area 321 may provide a graspable tab for a user to peel apart first and second films 322, 324. One or more portions of seal 326 may extend about the outermost portion of second film 324, while in other embodiments, one or more portions of seal 326 may be inset a suitable dimension from the outermost portions of second film 324.

According to one embodiment, seal 326 is configured to vent at the approximate midpoint of the longer straight sections of seal 326, such that the vent occurs along the side portions of the seal rather than at, for example, the corners. In some embodiments, seal 326 may vent along a longest of a plurality of sides, while in other embodiments, seal 326 may vent along each of a plurality of straight-sided seal sections. In various embodiments, seal 326 vents at an approximate mid-point of one or more straight-sided sections.

According to an exemplary embodiment, recess 328 may have a generally rectangular cross section 352 with rounded corners along its height and have a first width 360 of approximately 108.41 mm (4.268 inches) and a second width 362 of approximately 103.86 mm (4.089 inches) while other dimensions may be used according to other embodiments. In some embodiments, the perimeter of recess 328 substantially abuts or is adjacent to the interior portion or edge of seal 326. For example, there may be a distance of approximately 1-2 mm or less between portions of recess 328 and seal 326. In other embodiments a greater space may be defined between recess 328 and seal 326. The seal shown in FIG. 11 differs from the seal shown in FIG. 9 in that the seal width is greater. For example, if an increases seal strength is desired, the width of the seal is increased, which will tend to require a reduction in the diameter of the recess 326. The shape or configuration of the recess 328 is non-circular so that the recess extends along adjacent (e.g., compare FIG. 9 and FIG. 11) to the seal rather than being tangentially adjacent to the seal (i.e., provides pockets or space to receive a consumer's fingers inserted to remove from the packaging).

Figure 13:
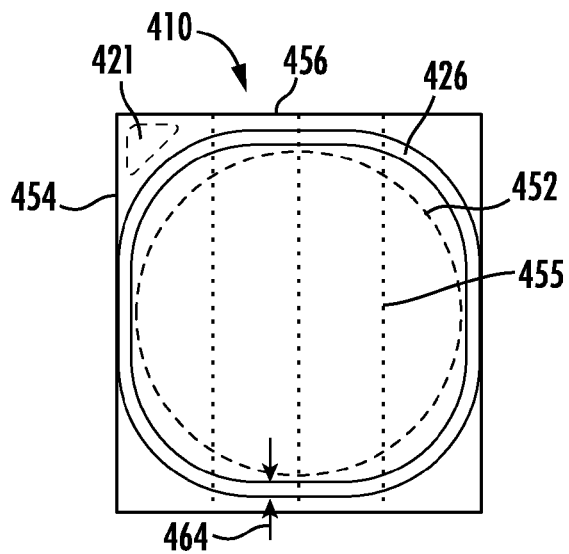
FIG. 13 is a top view of a packaged food product according to an exemplary embodiment.
Figure 14:
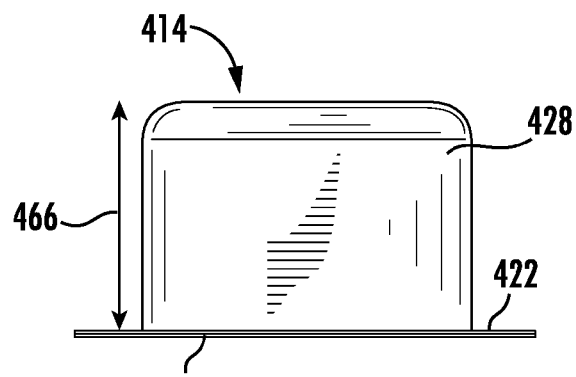
FIG. 14 is a side view of the packaged food product of FIG. 13.

Referring now to FIGS. 13-14, a packaged food product 410 is shown according to an exemplary embodiment, and includes a packaging 414 having a first film 422 and a second film 424 sealed together via a seal 426. First film 422 defines a recess, or dome, 428. Except as otherwise discussed herein, the packaging, films, recess, and seal shown in FIGS. 13-14 may have any or all of the features discussed with respect to FIGS. 1-8 or any of the other embodiments disclosed herein. As shown in FIG. 13, second film 424 may be a planar film having a square or rectangular perimeter. Alternatively, the second film may be circular, elliptical, elongated, or combinations thereof. In one embodiment, second film 424 defines a rectangle having sides 454, 456 which may be of various dimensions. The sides 454, 456, and height 466 of recess 428 may be any suitable dimension for a particular food product (not shown).

In some embodiments, second film 424 may include venting portions 455. For example, venting portions 455 may include a plurality of perforations (e.g., scores, microperforations, slots, slits, apertures, etc.). In one embodiment, as shown in FIG. 13, venting portions may include a plurality (e.g., 2, 3, etc.) of rows of perforations, which may be generally parallel, or may be oriented relative to one another in a non-parallel fashion. For example, according to one embodiment, venting portions 455 comprise three parallel lines of perforations extending across the width of second film 424. Venting portions 455 may be produced via a laser-scoring process or any other suitable process, and may extend partially or fully through one or more layers of second film 424. For example, in one embodiment, only the outer layer of second film 424 is perforated. Venting portions 455 may be configured to permit steam/moisture to release from the packaging (e.g., by expanding, rupturing, bursting, etc.) upon a predetermined pressure being reached within the packaging. It should be noted that venting portions 455 may be usable with any of the other embodiments disclosed herein. Furthermore, venting portions similar to venting portions 455 may be utilized on other portions of the packing and/or in the first film, including the top of the recess, the sides of the recess, etc.

According to an exemplary embodiment, seal 426 may have a width 464 of approximately 4 to 6 mm. According to other exemplary embodiments, the width of the seal may be based on the desired performance of the seal during heating of the food product. If early venting is desired, the seal width may be reduced. If increased sealing performance to inhibit venting of steam built up within the recess 428 during heating of the food product, the width of the seal may be increased. Seal 426 may have a generally square shape with rounded corners and may define an area 421. Area 421 may provide a graspable tab for a user to peel apart first and second films 422, 424. One or more portions of seal 426 may extend about the outermost portion of second film 424, while in other embodiments, one or more portions of seal 426 may be inset from the outermost portions of second film 424. Area 421 for grasping by the consumer may be provided in one or more or four of the corners of the packaging.

According to an exemplary embodiment, recess 428 may have a generally circular cross section 452 along its height. In some embodiments, portions of the perimeter of recess 428 substantially abut or are tangentially adjacent to the interior portion or edge of seal 426. For example, there may be a distance of approximately 1-2 mm or less between portions of recess 428 and seal 426. In other embodiments a greater space may be defined between recess 428 and seal 426.

Figure 15:
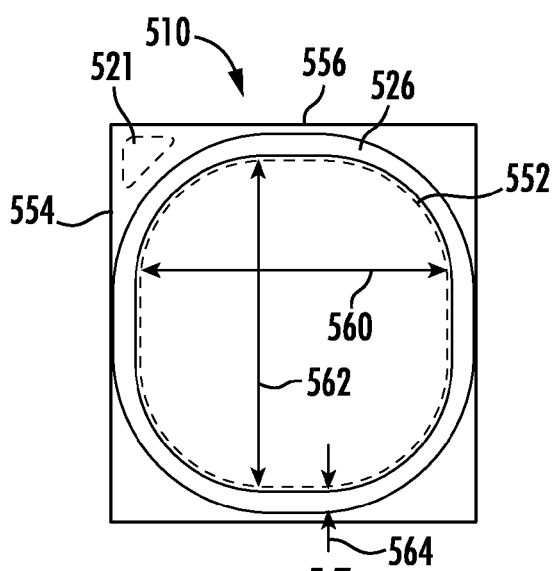
FIG. 15 is a top view of a packaged food product according to an exemplary embodiment.
Figure 16:
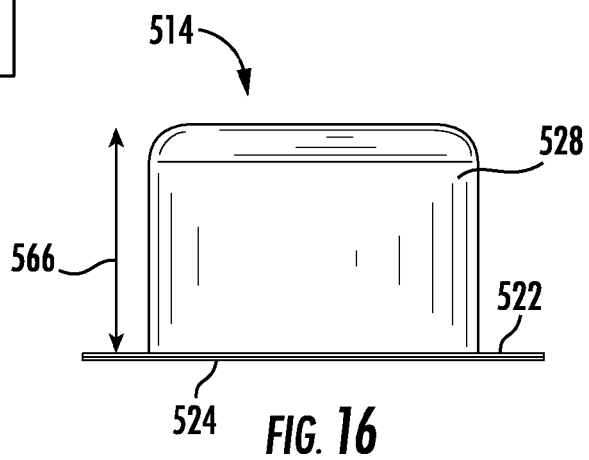
FIG. 16 is a side view of the packaged food product of FIG. 15.

Referring now to FIGS. 15-16, a packaged food product 510 is shown according to an exemplary embodiment, and includes a packaging 514 having a first film 522 and a second film 524 sealed together via a seal 526. First film 522 defines a recess, or dome, 528. Except as otherwise discussed herein, the packaging, films, recess, and seal shown in FIGS. 15-16 may have any or all of the features discussed with respect to FIGS. 1-8 or any of the other embodiments disclosed herein. As shown in FIG. 15, second film 524 may be a planar film having a square or rectangular perimeter. Alternatively, the second film may be circular, elliptical, elongated, or combinations thereof. In one embodiment, second film 524 defines a rectangle having sides 554, 556 which may have a variety of dimensions. The sides 554, 556, and height 566 of recess 528 may be any suitable dimension for a particular food product (not shown).

According to one embodiment, seal 526 may have a width 564 of approximately 6-8 mm. According to other exemplary embodiments, the width of the seal may be based on the desired performance of the seal during heating of the food product. If early venting is desired, the seal width may be reduced. If increased sealing performance to inhibit venting of steam built up within the recess 528 during heating of the food product, the width of the seal may be increased. Seal 526 may have a generally rectangular shape with rounded corners, and may define an area 521. Area 521 may provide a graspable tab for a user to peel apart first and second films 522, 524. One or more portions of seal 526 may extend about the outermost portion of second film 524, while in other embodiments, one or more portions of seal 526 may be inset from the outermost portions of second film 524.

According to an exemplary embodiment, recess 528 may have a generally rectangular cross section 552 with rounded corners along its height and have a first width 560 having a different dimension from a second width 562. Utilizing differing widths may, for example, provide clearance for a user to grasp a food product, etc. In some embodiments, the perimeter of recess 528 substantially abuts or is adjacent to the interior portion or edge of seal 526. For example, there may be a distance of approximately 1-2 mm or less between portions of recess 528 and seal 526. In other embodiments a greater space may be defined between recess 528 and seal 526.

Referring now to FIGS. 17-18, a packaged food product 610 is shown according to an exemplary embodiment, and includes a packaging 614 having a first film 622 and a second film 624 sealed together via a seal 626. First film 622 defines a recess, or dome, 628. Except as otherwise discussed herein, the packaging, films, recess, and seal shown in FIGS. 17-18 may have any or all of the features discussed with respect to FIGS. 1-8 or any of the other embodiments disclosed herein. As shown in FIG. 17, second film 624 may be a planar film having a square or rectangular perimeter. Alternatively, the second film may be circular, elliptical, elongated, or combinations thereof. In one embodiment, second film 624 defines a rectangle having sides 1654, 656 which may have a variety of dimensions. The sides 654, 656, and height 666 of recess 628 may be any suitable dimension for a particular food product (not shown).

According to an exemplary embodiment, seal 626 may have a width 664 of approximately 6 to 8 mm. According to other exemplary embodiments, the width of the seal may be based on the desired performance of the seal during heating of the food product. If early venting is desired, the seal width may be reduced. If increased sealing performance to inhibit venting of steam built up within the recess 628 during heating of the food product, the width of the seal may be increased. Seal 626 may have a generally rectangular shape with rounded corners, and may define an area 621. Area 621 may provide a graspable tab for a user to peel apart first and second films 622, 624. One or more portions of seal 626 may extend about the outermost portion of second film 624, while in other embodiments, one or more portions of seal 626 may be inset from the outermost portions of second film 624.

According to an exemplary embodiment, recess 628 may have a generally rectangular cross section 652 with rounded corners along its height and have a first width with a different dimension from a second width. In some embodiments, the perimeter of recess 628 substantially abuts or is adjacent to the interior portion or edge of seal 626. For example, there may be a distance of approximately 1 to 2 mm or less between portions of recess 628 and seal 626. In other embodiments a greater space may be defined between recess 628 and seal 626.

According to an exemplary embodiment, a relief 668 (e.g., gap, vent, passage, weakened portion, etc.) is formed in seal 626. Relief 668 may provide a self-venting feature for packaging 614 by permitting a desired amount of steam or moisture to escape from the interior of packaging 614 during heating of food product 612. As shown in FIG. 17, relief 668 may be a break or weakened area in seal 626 with a width 670 of approximately 6.35 mm (0.250 inches) while other dimensions may be used according to other embodiments (e.g., 0.375 inches, etc.). Alternatively, a relief may be provided by having a seal with a varying seal width.

Referring now to FIGS. 19-20, a packaged food product 710 is shown according to an exemplary embodiment, and includes a packaging 714 having a first film 722 and a second film 724 sealed together via a seal 726. First film 722 defines a recess, or dome, 728. Except as otherwise discussed herein, the packaging, films, recess, and seal shown in FIGS. 19-20 may have any or all of the features discussed with respect to FIGS. 1-8 or any of the other embodiments disclosed herein. As shown in FIG. 19, second film 724 may be a planar film having a square or rectangular perimeter. Alternatively, the second film may be circular, elliptical, elongated, or combinations thereof. In one embodiment, second film 724 defines a rectangle having sides 754, 756 which may have a variety of dimensions. The sides 754, 756, and height 766 of recess 728 may be any suitable dimension for a particular food product (not shown).

According to an exemplary embodiment, seal 726 may have a width 764 of approximately 6-8 mm. According to other exemplary embodiments, the width of the seal may be based on the desired performance of the seal during heating of the food product. If early venting is desired, the seal width may be reduced. If increased sealing performance to inhibit venting of steam built up within the recess 728 during heating of the food product, the width of the seal may be increased. Seal 726 may have a generally rectangular shape with rounded corners, and may define an area 721. Area 721 may provide a graspable tab for a user to peel apart first and second films 722, 724. One or more portions of seal 726 may extend about the outermost portion of second film 724, while in other embodiments, one or more portions of seal 726 may be inset from the outermost portions of second film 724.

According to an exemplary embodiment, recess 728 may have a generally rectangular cross section 752 with rounded corners along its height and have a first width 760 and a second width 762 which may be a variety of dimensions. In some embodiments, the perimeter of recess 728 substantially abuts or is adjacent to the interior portion or edge of seal 726. For example, there may be a distance of approximately 1-2 mm or less between portions of recess 728 and seal 726. In other embodiments a greater space may be defined between recess 728 and seal 726.

According to an exemplary embodiment, a relief 768 (e.g., gap, vent, passage, weakened portion, etc.) is formed in seal 626. Relief 768 may provide a self-venting feature for packaging 714 by permitting a desired amount of steam or moisture to escape from the interior of packaging 714 during heating of food product 712. As shown in FIG. 19, relief 768 may be a break or weakened area in seal 726 with a width 770 of approximately 0.125 to 0.50 inches (e.g., 0.250 inches), while other dimensions may be used according to other embodiments.

Referring now to FIGS. 21-22, a packaged food product 810 is shown according to an exemplary embodiment, and includes a packaging 814 having a first film 822 and a second film 824 sealed together via a seal 826. First film 822 defines a recess, or dome, 828. Except as otherwise discussed herein, the packaging, films, recess, and seal shown in FIGS. 21-22 may have any or all of the features discussed with respect to FIGS. 1-8 or any of the other embodiments disclosed herein. As shown in FIG. 21, second film 824 may be a planar film having a square or rectangular perimeter. Alternatively, the second film may be circular, elliptical, elongated, or combinations thereof. In one embodiment, second film 824 defines a rectangle having sides 854, 856 which may have a variety of dimensions. The sides 854, 856, and height 866 of recess 828 may be any suitable dimension for a particular food product (not shown).

According to an exemplary embodiment, seal 826 may have a width 864 of approximately 6-8 mm. According to other exemplary embodiments, the width of the seal may be based on the desired performance of the seal during heating of the food product. If early venting is desired, the seal width may be reduced. If increased sealing performance to inhibit venting of steam built up within the recess 828 during heating of the food product, the width of the seal may be increased. Seal 826 may have a generally rectangular shape with rounded corners, and may define an area 821. Area 821 may provide a graspable tab for a user to peel apart first and second films 822, 824. One or more portions of seal 826 may extend about the outermost portion of second film 824, while in other embodiments, one or more portions of seal 826 may be inset from the outermost portions of second film 824.

According to an exemplary embodiment, recess 828 may have a generally rectangular cross section 852 with rounded corners along its height and have a first width 860 and a second width 862 which may have a variety of dimensions. In some embodiments, the perimeter of recess 828 substantially abuts or is adjacent to the interior portion or edge of seal 826. For example, there may be a distance of approximately 1-2 mm or less between portions of recess 828 and seal 826. In other embodiments a greater space may be defined between recess 828 and seal 826.

According to an exemplary embodiment, multiple reliefs 868 (e.g., gaps, vents, passages, weakened portions, etc.) are formed in seal 826. Reliefs 868 may provide a self-venting feature for packaging 814 by permitting a desired amount of steam or moisture to escape from the interior of packaging 814 during heating of food product 812. As shown in FIG. 19, each relief 868 may be a break or weakened area in seal 826 with a width 870 of approximately 6.35 mm (0.250 inches) while other dimensions may be used according to other embodiments. For example, different reliefs 868 may have different widths based on the position of the relief, the type of food product, or other factors. As shown in FIG. 19, multiple reliefs 868 may be generally equally distributed along seal 826, while in other embodiments reliefs 868 may be otherwise distributed along seal 826 (e.g., unequally spaced, etc.).

Figure 23:
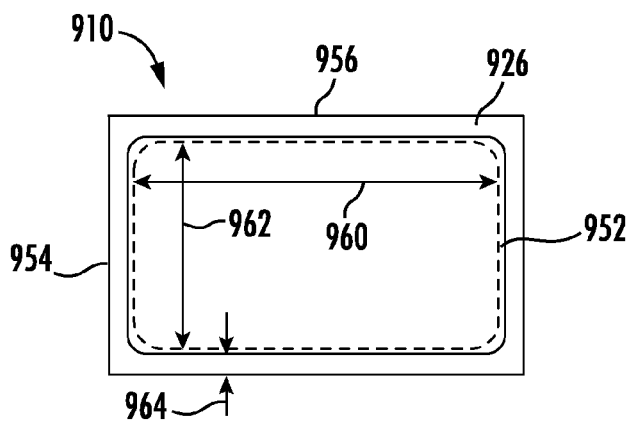
FIG. 23 is a top view of a packaged food product according to an exemplary embodiment.
Figure 24:
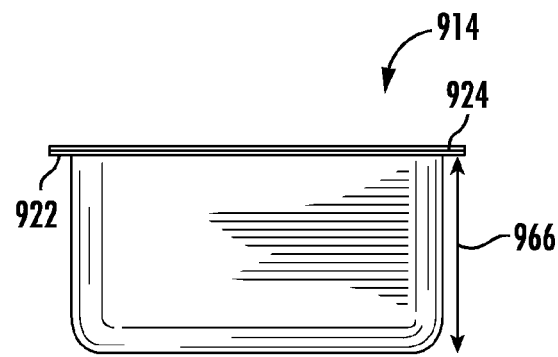
FIG. 24 is a side view of the packaged food product of FIG. 23.
Figure 25:
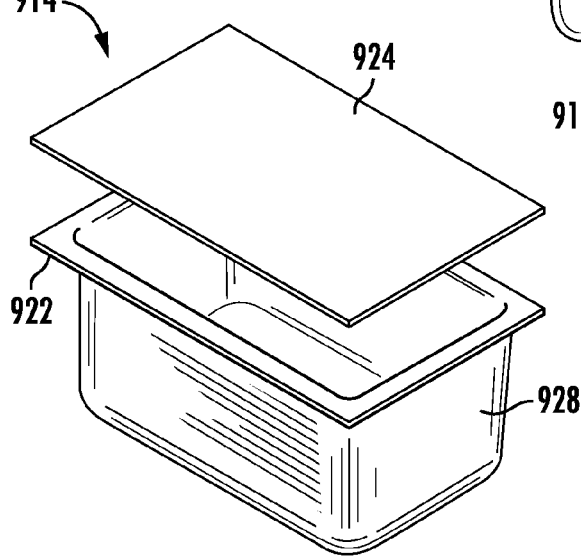
FIG. 25 is an exploded perspective view of the packaged food product of FIG. 23.

Referring now to FIGS. 23-25, a packaged food product 910 is shown according to an exemplary embodiment, and includes a packaging 914 having a first film 922 and a second film 924 sealed together via a seal 926. First film 922 defines a recess, or dome, 928. Recess 928 may be shaped to generally conform to a food product (e.g., a hot dog, one or two hamburgers/cheeseburgers, etc.). Except as otherwise discussed herein, the packaging, films, recess, and seal shown in FIGS. 23-25 may have any or all of the features discussed with respect to FIGS. 1-8 or any of the other embodiments disclosed herein. As shown in FIG. 23, second film 924 may be a planar film having a square or rectangular perimeter. Alternatively, the second film may be circular, elliptical, elongated, or combinations thereof. In one embodiment, second film 924 defines a rectangle having a first side 954 between and a second side 956 which may have a variety of dimensions. The sides 954, 956 and height 966 of recess 928 may be any suitable dimension for a particular food product (not shown).

According to an exemplary embodiment, seal 926 may have a width 964 of approximately 7-8 mm. According to other exemplary embodiments, the width of the seal may be based on the desired performance of the seal during heating of the food product. If early venting is desired, the seal width may be reduced. If increased sealing performance to inhibit venting of steam built up within the recess 928 during heating of the food product, the width of the seal may be increased. In some embodiments, seal 926 may have a generally rectangular shape. One or more portions of seal 926 may extend about the outermost portion of second film 924, while in other embodiments, one or more portions of seal 926 may be inset from the outermost portions of second film 924.

According to an exemplary embodiment, recess 928 may have a generally rectangular cross section 952 with rounded corners along its height and have a first width 960 and a second width 962 which may be a variety of dimensions. In some embodiments, the perimeter of recess 928 substantially abuts or is adjacent to the interior portion or edge of seal 926. For example, there may be a distance of approximately 1-2 mm or less between portions of recess 928 and seal 926. In other embodiments a greater space may be defined between recess 928 and seal 926.

Figure 26:
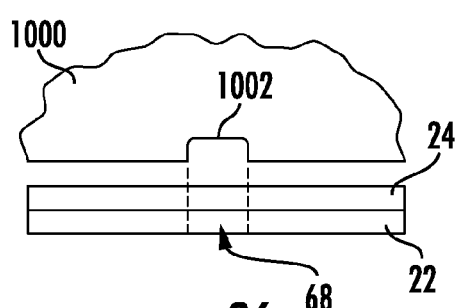
FIG. 26 is a schematic side view of a portion of a mechanism for forming a seal for a packaged food product according to an exemplary embodiment.

Referring to FIG. 26, a portion of a mechanism for forming a seal such as seal 26 for packaged food product 10 is shown schematically according to an exemplary embodiment. The mechanism includes a plate 1000 with a recess 1002 (e.g., gap, void, etc.). Plate 1000 is lowered onto first film 22 and second film 24. Energy (e.g., heat, ultrasonic vibrations, etc.) and pressure couples first film 22 to second film 24 to form seal 26. In some embodiments, a relief portion 68 is formed by the portion of first film 22 and second film 24 aligned with recess 1002 that are not contacted by plate 1000. The depth, width, and number of recesses 1002 provided in plate 1000 may be varied to provide the appropriate number of weakened areas of the seal (e.g., for venting, ease of opening, etc.). According to an exemplary embodiment, relief portion 68 has a height, or depth, 1003 of approximately 0.010 inches, although this dimension may be varied to provide a relatively stronger or weaker seal strength at the vent portion.

Figure 27:
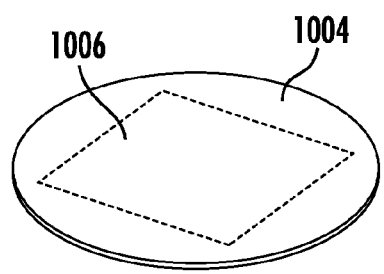
FIG. 27 is perspective view of an absorbent member according to an exemplary embodiment.

According to various embodiments shown herein, an absorbent or paper layer may be provided as part of a lamination or film (e.g., as part of first or second films 22, 24). According to alternative embodiments, rather than or in addition to providing an absorbent layer as part of a film or lamination, a separate absorbent member may be provided. For example, referring to FIG. 27, an absorbent pad or member 1004 may be provided as a loose article within the recess (i.e., not attached to the other components of the packaging). In one embodiment, absorbent member 1004 may be disk-shaped. According to other embodiments, absorbent member may take other shapes, and may be shaped to conform to or have a shape corresponding to a packaging recess, a food product, etc. Furthermore, absorbent member 1004 may include a label 1006, which may include printed text and/or graphics, etc., that may be printed onto absorbent member 1004 or may be provided as a separate label material. When the absorbent member also serves as a label, the absorbent member may be coupled to the first film 222 and/or the second film 224.

As shown in various embodiments herein, the inner perimeter of the recess or dome of the packaging may extend from adjacent to or proximate to the seal portion. In other embodiments, a space may be provide between the recess and the seal along all or a portion of the periphery of the recess. The shape of the seal may also be varied to suit particular applications. Utilizing a generally square or rectangular seal may provide increased seal strength (e.g., by increasing the distance from the seal to the recess). Furthermore, the size and shape of the recess may be any of a wide variety. For example, providing a recess having differing width/length dimensions may provide room for users to grasp food products with fingers, utilize utensils, etc.

Referring now to FIGS. 28-39C, various schematic representations are provided according to exemplary embodiments to illustrate different seal portions (e.g., portions where the first and second films are sealed together) and vent portions (e.g., portions having a relatively weaker seal between the first and second films, or alternatively, portions void of a seal between the first and second films). According to any of the various embodiments disclosed herein, vent portions may provide venting of steam/pressure through the interface of the first and second films in a variety of ways. For example, a width of a seal may be narrowed to provide a vent portion having a relatively weaker seal strength. Alternatively, the strength of the seal may be lessened by providing a "relief" in a seal bar used to form the seal (see e.g., FIG. 26), thereby forming a vent portion having a relatively weaker seal strength. Further, a wide variety of dimensions may be varied (e.g., the length and/or width of a narrowed portion of seal, the length, width, and/or depth of a relief formed in a seal bar, etc.) to vary the strength of a seal at a seal portion. Such variation in the seal configuration, dimensions, and geometry are provided in exemplary embodiments because the packaging uses polymer film layers that seal through an absorbent layer (which is possible due to polymer fibers in the absorbent layer).

It should also be noted that the sealing and venting features disclosed herein may be used with any suitable recess, or "dome," that receives food products, including domes having a generally circular cross-section, square cross-section, rectangular cross-section, square/rectangular with rounded corners cross-section, multi-sided polygonal cross-section, etc. as shown in the FIGURES herein. Further, the seal portions may be spaced apart from (e.g., in the case of a square/rectangular seal around a circular dome) or adjacent to (in the case of a circular seal around a circular dome) the dome. All such combinations of domes, seal portions, and vent portions are within the scope of the present disclosure. Greater details of various sealing/venting combinations are provided below with respect to FIGS. 28-39C. It should be understood that unless otherwise provided herein, the sealing/venting features shown in FIGS. 28-39C may be included as a part of any of the food packages shown herein and/or utilized with any other features disclosed herein. For example, any of the seals may be used with a generally circular cross section dome (see FIG. 17) or with a square/rectangular with rounded corners cross section dome (see FIG. 19).

According to various embodiments, the seal portions may have various widths. For example, according to one embodiment, when using a generally circular dome, the seal portion may have a width of approximately 5 mm; when using a square/rectangle with rounded edges dome, the seal portion may have a width of approximately 7 mm; and when using a seal portion with inner/outer seal portions (see e.g. FIG. 37, FIG. 39D, and the other FIGURES herein) the inner and outer seal portions may each have a width of approximately 2 mm and be spaced approximately 3 mm apart, for a total seal portion width of 7 mm. According to various other embodiments, other widths for the various seal portions may be used.

Figure 28:
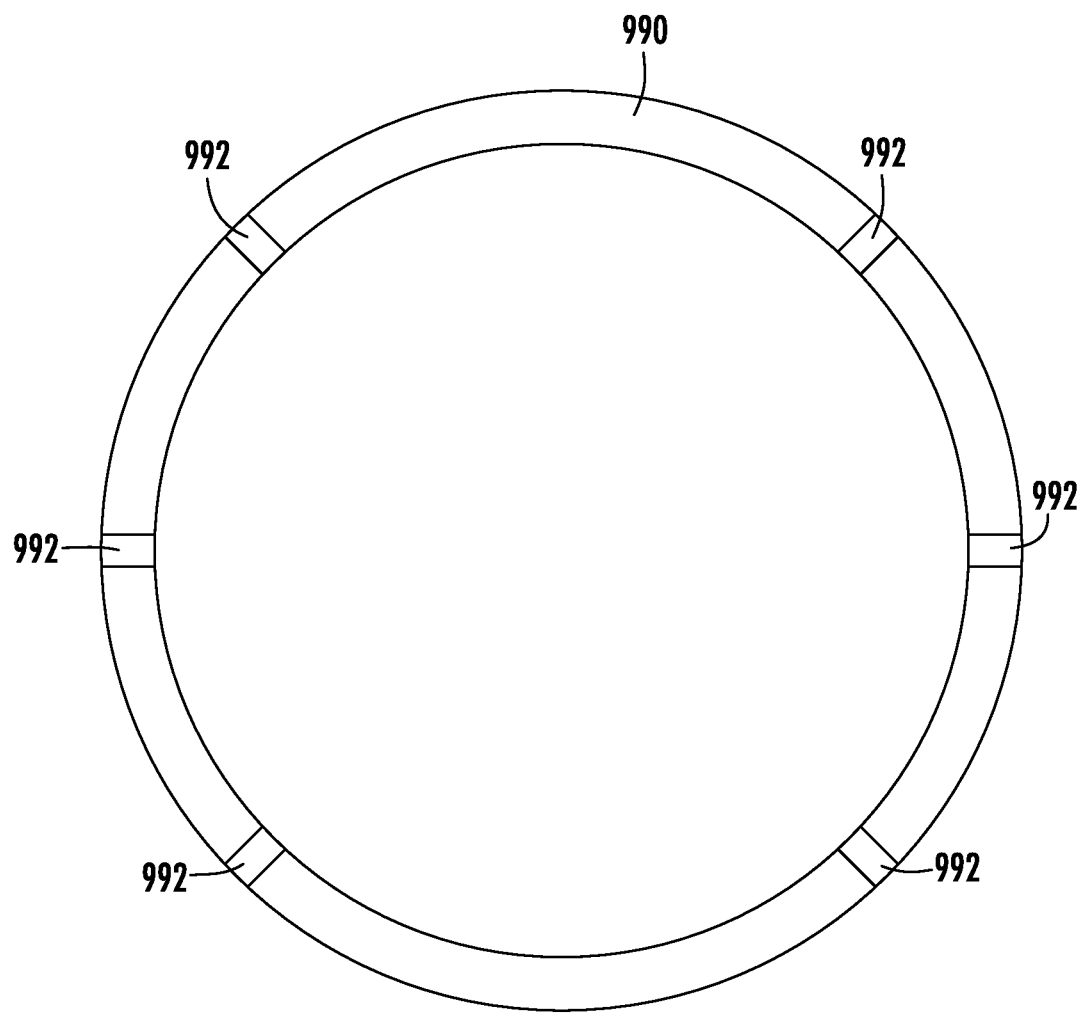
FIGS. 28-39D illustrate seal portions and vent portions usable with food packaging according to various exemplary embodiments.

Referring now to FIG. 28, a seal portion 990 is shown according to an exemplary embodiment and includes a number of vent portions 992. As shown in FIG. 28, seal portion 990 may be circular, or square/rectangular with rounded corners. In one embodiment, seal portion 990 may include three vent portions 992 on opposing sides of seal portion 990 (e.g., in the case of generally square/rectangle seal) although according to various other embodiments, more or fewer vent portions may be utilized, and the size, spacing, placement, and shape of vent portions 992 may be varied to suit a particular application. In one embodiment, vent portions 992 have a length of approximately 0.250 inches, although other dimensions may be used to provide a larger or smaller vent portion (e.g., 0.125 inches, 0.375 inches, 0.500 inches, etc.).

Figure 29:
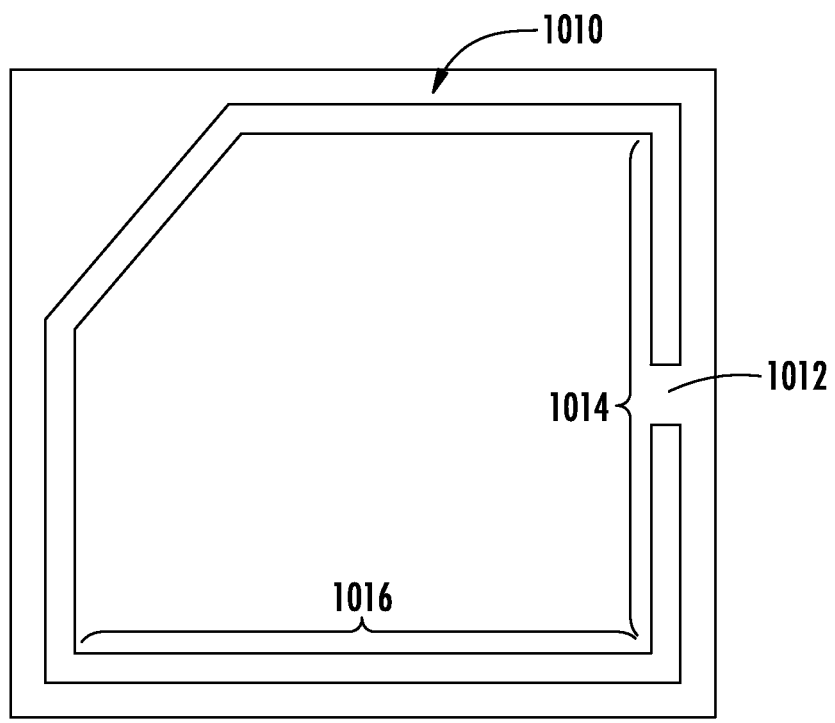
Figure 30:
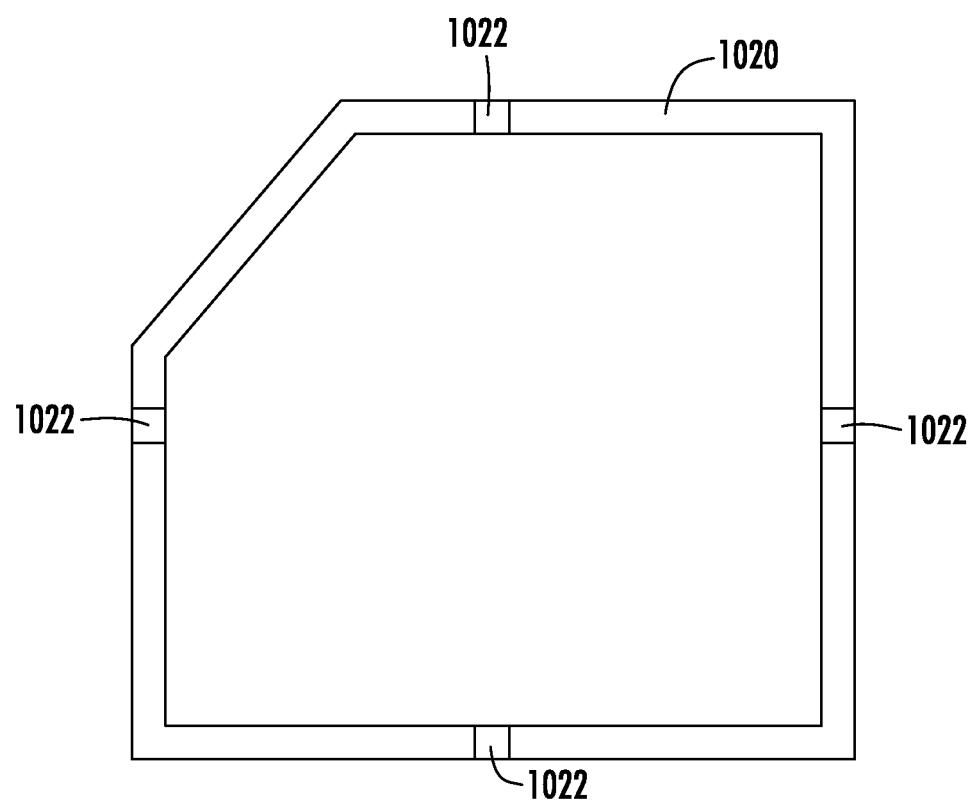

Referring to FIG. 29, a seal portion 1010 is shown according to an exemplary embodiment. As shown in FIG. 29, a portion of seal portion 1010 is formed by straight sides joined perpendicularly, and has longest sides 1014, 1016. Vent portion 1012 may be formed in one or both of sides 1014, 1016 and may have a length of 0.375 inches. Furthermore, in some embodiments, additional sides may have further vent portions. For example, referring to FIG. 30, a seal portion 1020 is shown according to an exemplary embodiment and includes four vent portions 1022, each having a length of 0.250 inches.

Figure 31A:
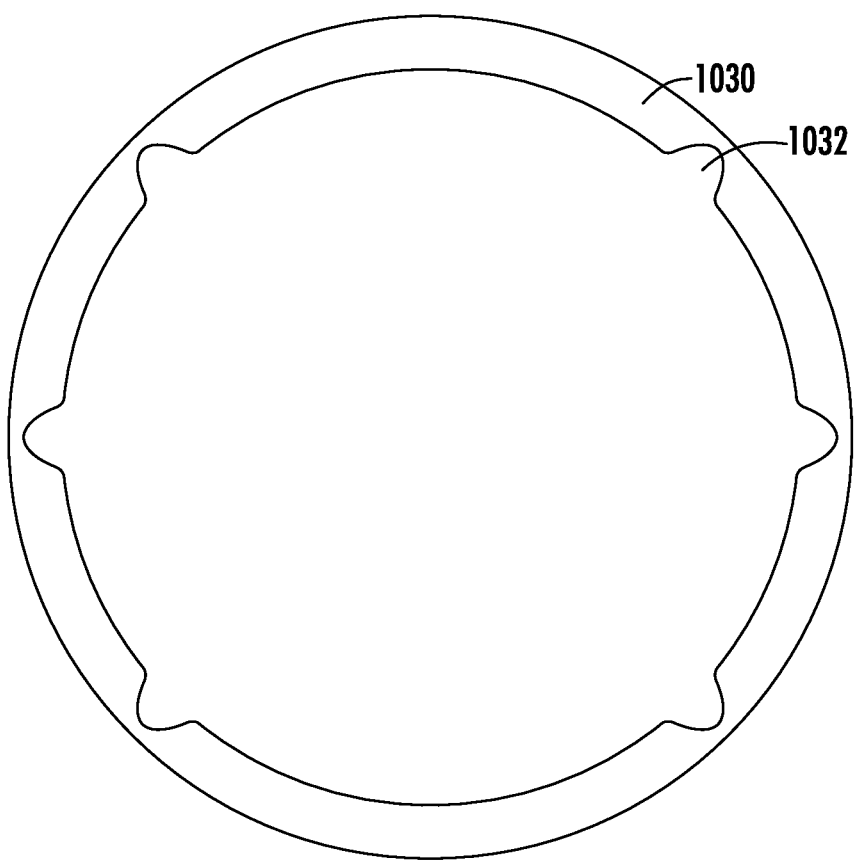
Figure 31B:
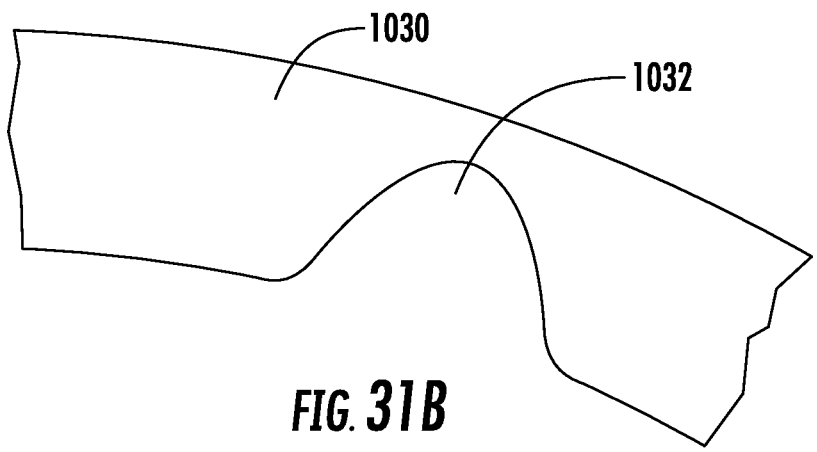
Figure 32A:
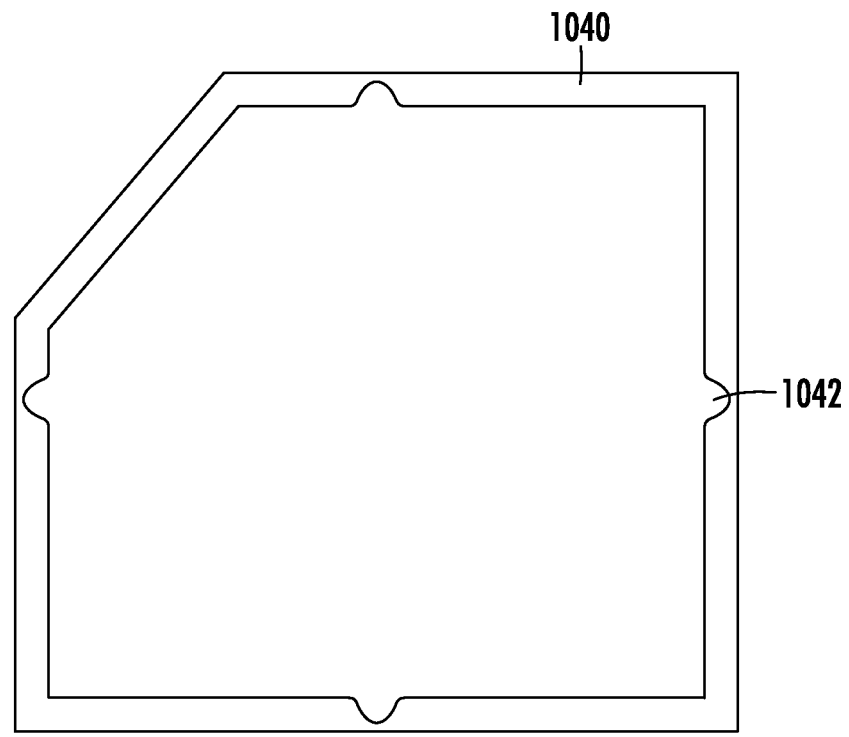
Figure 32B:
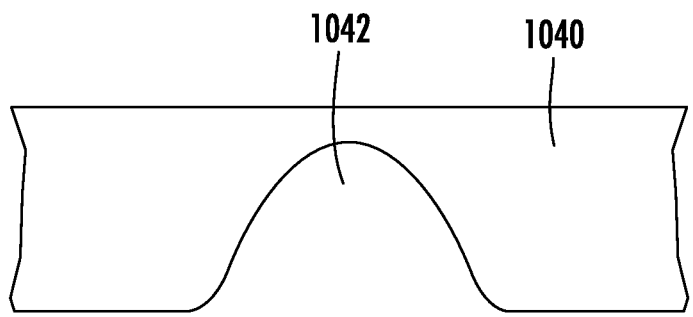

Referring to FIGS. 31A-32, a seal portion 1030 has a number of vent portions 1032. Vent portion 1032 is formed by a portion of seal portion 1030 having a reduced width (e.g., forming a recess, or notch, in seal portion 1030). The notch may provide a weakened seal area or a void in the seal portion. While vent portion 1032 is shown formed by a generally curved, or chamfered, notch in seal portion 1030, vent portion 1032 may be formed with other shapes (e.g., V-shapes, U-shapes, rectangular shapes, etc.). In some embodiments, vent portions 1032 may be formed by reducing a seal width from 7 mm to 3 mm, or alternatively, from 5 mm to 2 mm, and the notch, or recess, may have a width of approximately 0.187 inches on the inner edge of the seal portion, as shown in FIG. 31B. Vent portion 1030 may be generally circular, or alternative square/rectangular with rounded corners. Further, a number (e.g., 3, 4, etc.) of vents may be provided on opposing sides of seal portion 1030 (e.g., on opposite sides of a rectangular seal, etc.). According to other embodiments, vent portions 1032 may be provided around the entire perimeter of seal portion 1030, and may be spaced at regular or irregular intervals. Referring to FIG. 32, a straight-sided seal portion 1040 may include one or more vent portions 1042 on one or more of each of the sides (e.g., on the four longer of the five straight sides, on the two longest sides, etc.). Vent portions 1042 may be formed in a similar manner to vent portions 1032 shown in FIG. 31.

Figure 33:
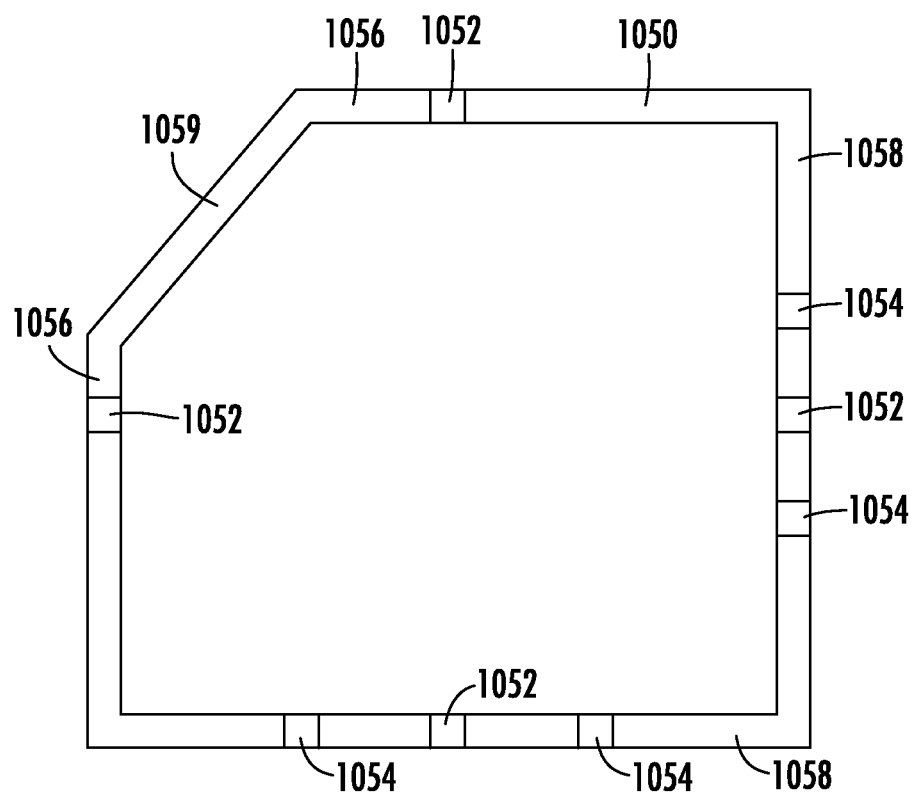

Referring now to FIG. 33, a seal portion 1050 is shown according to an exemplary embodiment and is a straight-sided seal having a shortest side 1059, two intermediate length sides 1056, and two long sides 1058. Vent portions 1052 may be provided on each of the intermediate sides 1056 and long sides 1058. According to one embodiment, vent portions 1052 are provided at the midpoint along the length of each of sides 1056, 1058. Furthermore, additional vent portions 1054 may be provided, for example, equally spaced to either side of vent portions 1052 on long sides 1058. Alternatively, additional vents could be provided on either side of vent portions 1052 on intermediate sides 1056. In one embodiment, vent portions 1052, 1054 have a length of approximately 0.25 inches.

Figure 34:
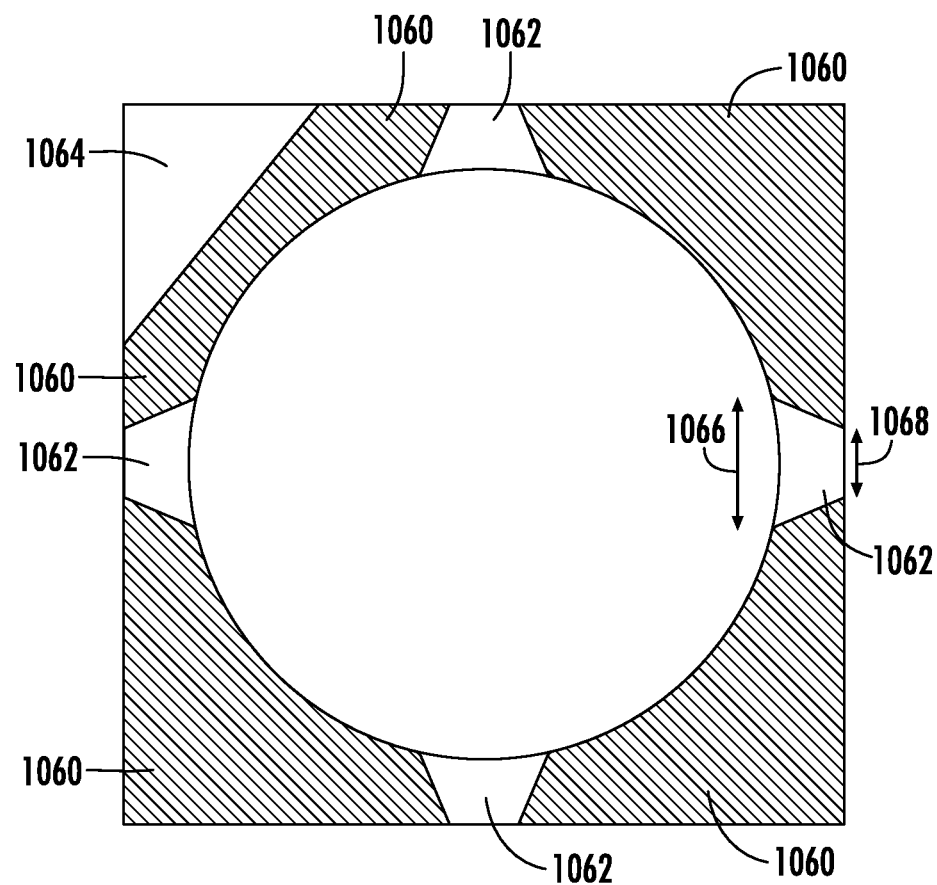
Figure 35:
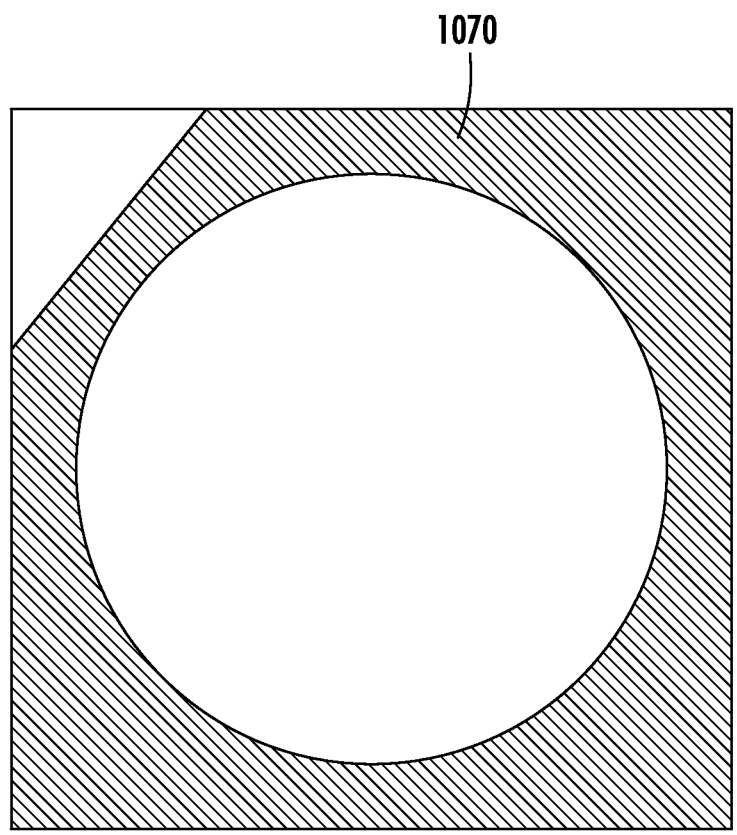

Referring to FIG. 34, a seal portion 1060 is shown according to an exemplary embodiment. As shown in FIG. 34, the entire portions of the first and second films (except the recess, or dome portion), may be sealed together except for a peelable corner portion 1064. Vent portions 1062 may be provided at four equally spaced locations about the dome (e.g., a circular cross-section dome), although more or fewer vent portions may be provided and the vent portions may be equally or unequally spaced about the perimeter of the dome. According to one embodiment, each vent portion tapers from a first width 1066 adjacent the dome to a second width 1068 at the edge of the packaging. In one embodiment, first width 1066 may be about twice second width 1068 (e.g., providing a 2:1 ratio), although other dimensions (e.g., a 3:2 ratio, etc.) may be used according to various alternative embodiments. For example, first width 1066 may be approximately 0.5 inches, and second width 1068 may be approximately 0.25 inches. Alternatively, first width 1066 may be approximately 0.375 inches and second width 1068 may be approximately 0.25 inches. In some embodiments, vent portions 1062 are provided at the narrowest portions of seal portion 1060 (e.g., at the approximate midpoint along each of the straight edges of the first and second films). FIG. 35 is similar to FIG. 34, except that seal portion 1070 shown in FIG. 35 has no venting such as vent portions 1062 shown in FIG. 34.

Figure 36:
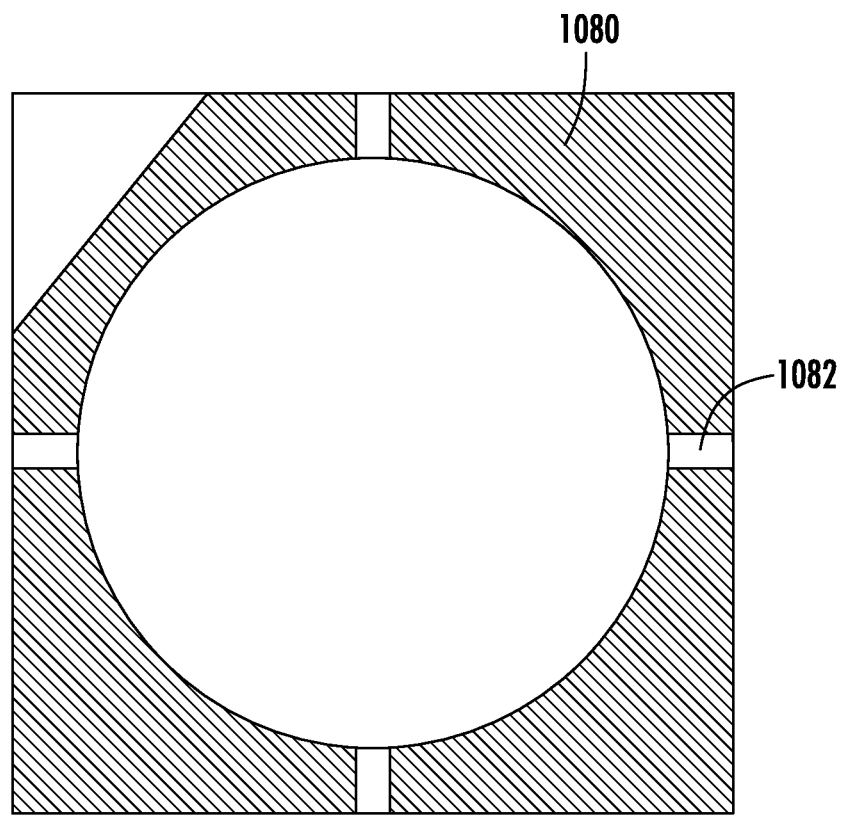

Referring now to FIG. 36, a seal portion 1080 is shown according to an exemplary embodiment and is similar to seal portion 1060 shown in FIG. 34 except that vent portions 1082 are straight-sided vent portions rather than tapered. The length (e.g., 0.25 in., 0.375 in., 0.50 in., etc.) of vent portions 1082 may be varied to suit a particular application, and the number (e.g., more or less than four) and spacing (regular-spaced, irregular-spaced) of vent portions may be varied.

Figure 37A:
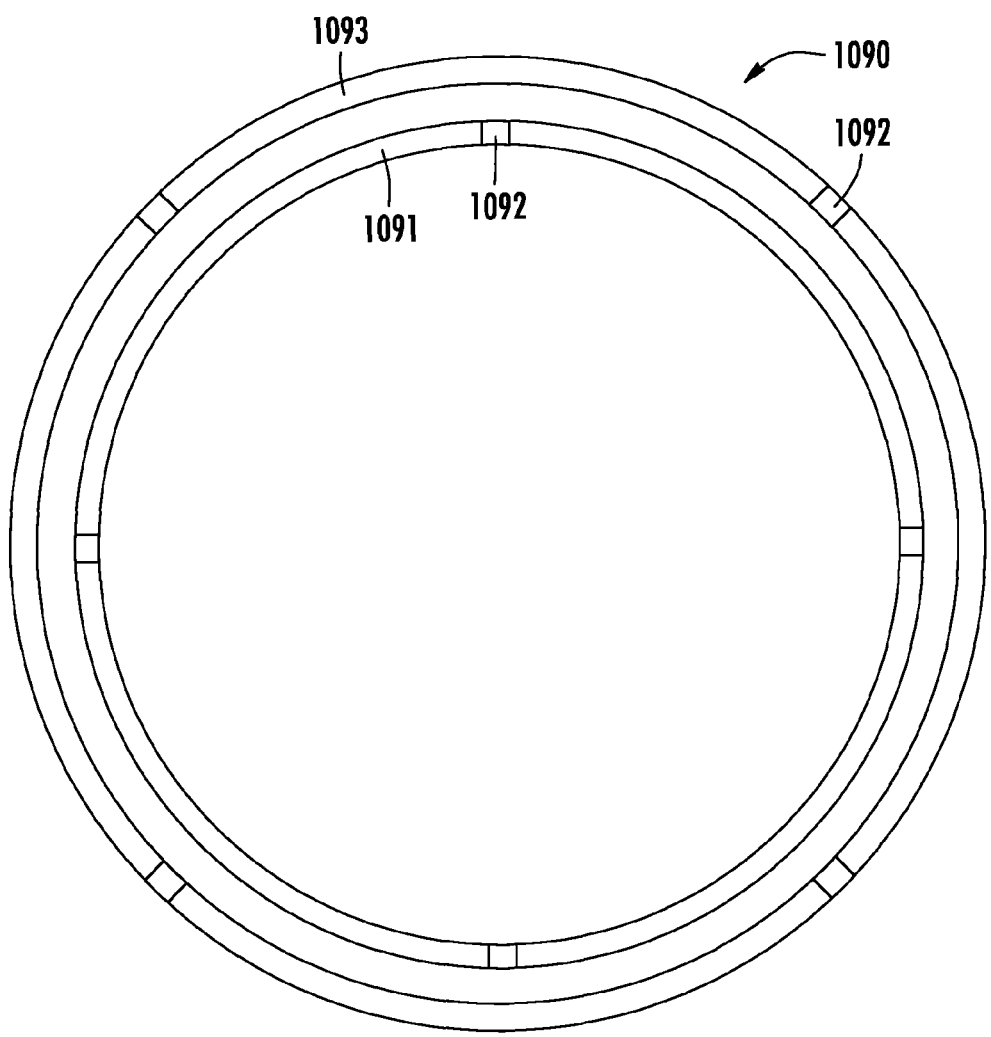
Figure 37B:
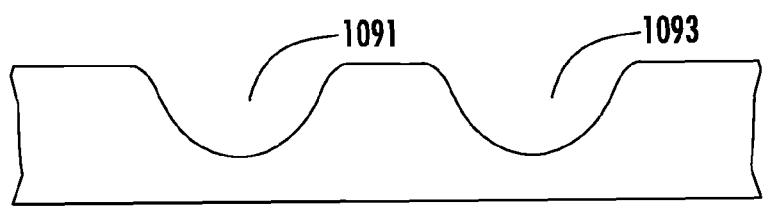
Figure 37C:
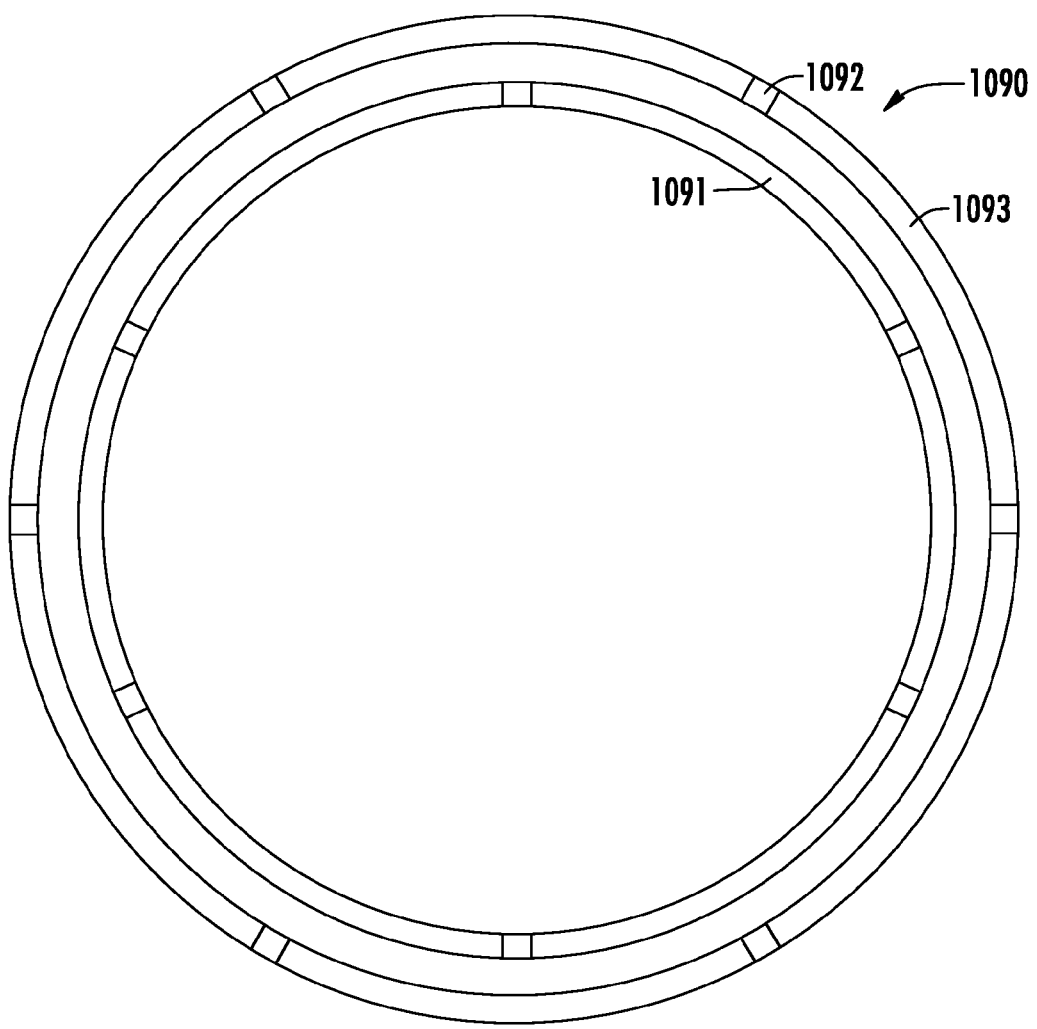
Figure 37D:
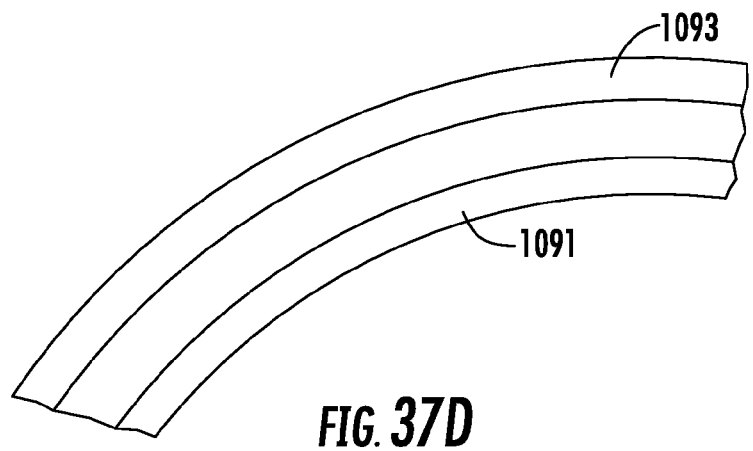
Figure 37E:
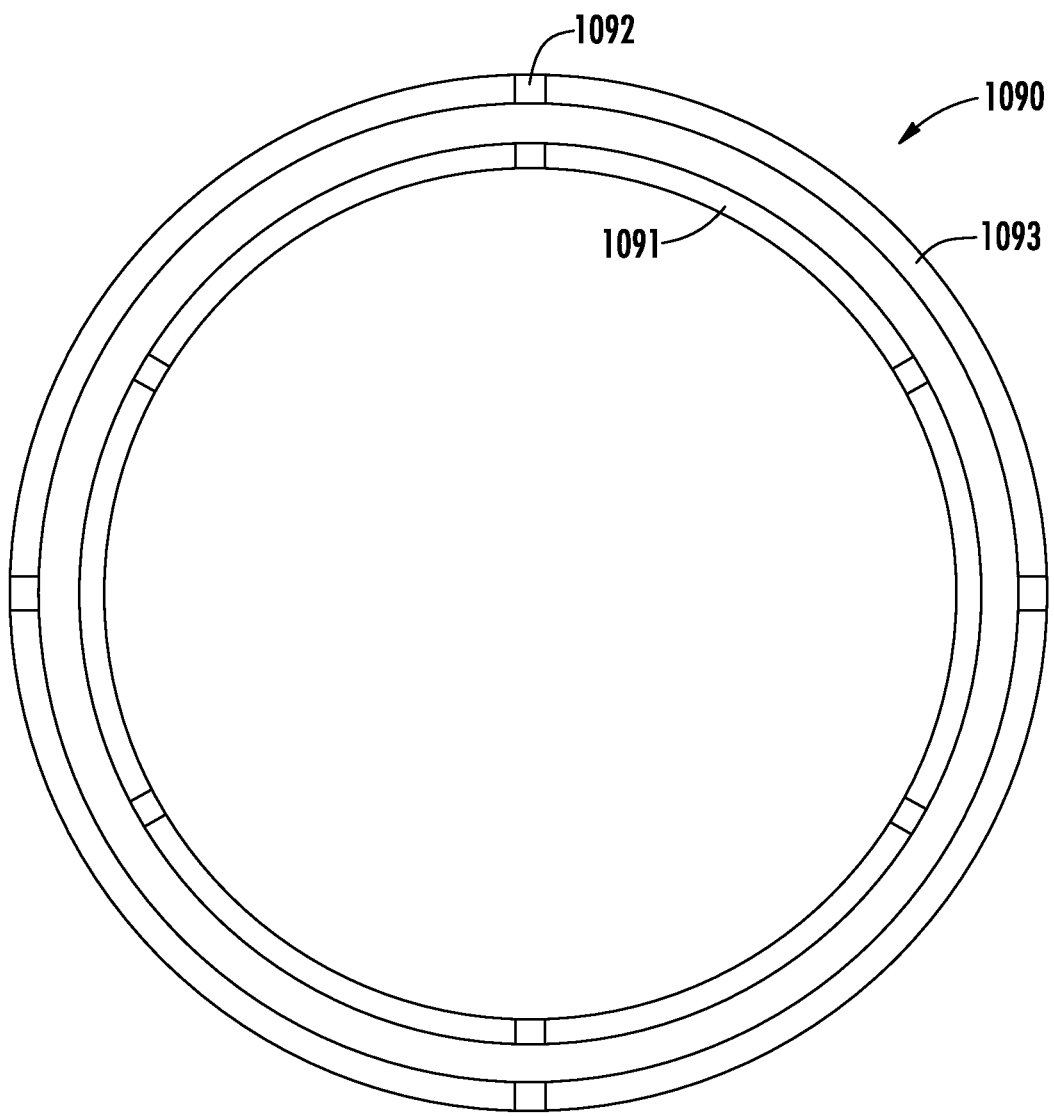

Referring to FIG. 37A-37E, a seal portion 1090 is shown according to an exemplary embodiment and includes an inner seal portion 1091 and an outer seal portion 1093 in a generally parallel fashion. According to one embodiment, inner and outer seal portions 1091, 1093 may be concentric circles, although according to various other embodiments, inner and outer seal portions 1091, 1093 may take any suitable shape, with inner seal portion running along the inside of outer seal portion 1093. According to one embodiment, seal portions 1091, 1093 each includes 4 vent portions 1092 equally spaced about seal portions 1091, 1093. In some embodiments, vent portions 1092 on inner seal portion 1091 may be staggered apart from (e.g., located midway between) vent portions 1092 on outer seal portion 1093. According to other embodiments, the vent portions on seal portions 1091, 1093 may be generally aligned (FIG. 37E), or offset in a different fashion than as shown in FIG. 37A. FIG. 37B shows a profile of inner and outer seal portions 1091,1093 according to an exemplary embodiment.

While as shown in FIG. 37A each of inner and outer seal portions 1091, 1093 may include 4 vent portions, more or fewer vent portions may be utilized. For example, in some embodiments, six vent portions 1092 may be provided on each of seal portions 1091, 1093, and the vent portions may be staggered (see FIG. 37C). In other embodiments, differing numbers of vent portions 1092 may be provided on each of inner seal portion 1091 and outer seal portion 1093. For example, inner seal portion 1091 may include six vent portions 1092 and outer seal portion 1093 may include 4 vent portions 1092, and one or more "pairs" of vent portions on seal portions 1091. 1093 may be staggered and/or aligned (see FIG. 37E).

Figure 38A:
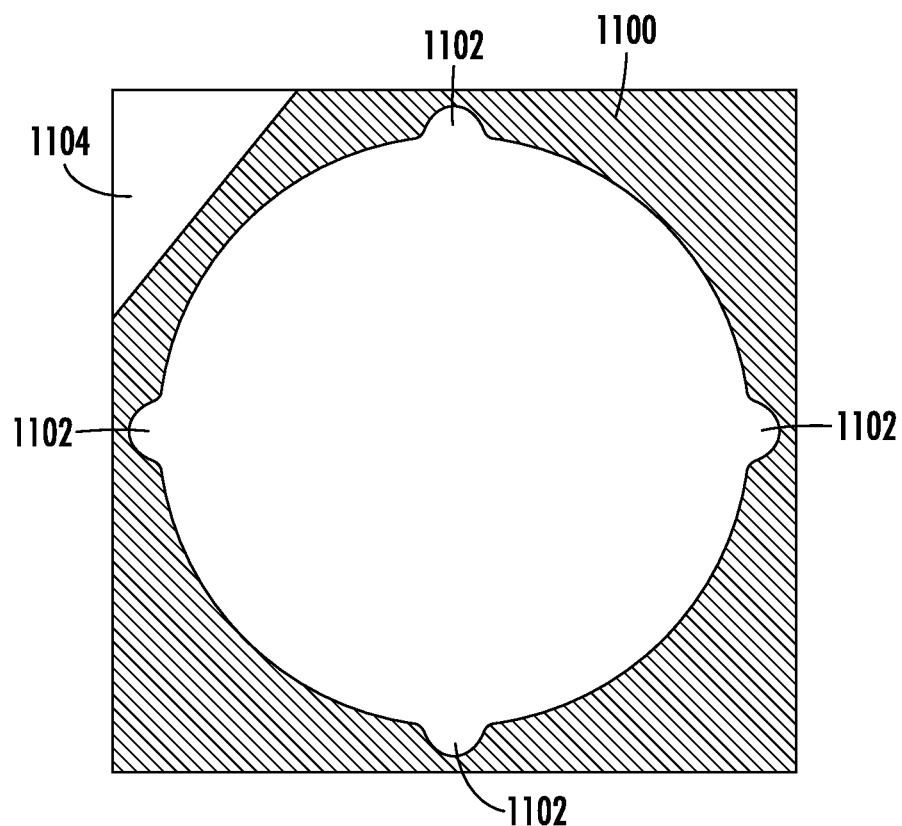
Figure 38B:
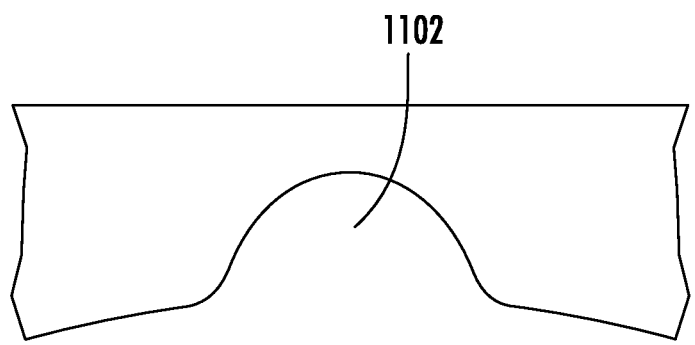

Referring to FIGS. 38A-38B, a seal portion 1100 is shown according to an exemplary embodiment, and includes a number of vent portions 1102. Seal portion 1100 covers the entire interface between the first and second films except a peelable portion 1104 at one or more corners. As shown in FIG. 38, four vent portions 1102 are provided in the form of narrowed portions of seal portion 1100 (e.g., in a manner similar to vent portions 1032 shown in FIG. 31). The size, shape, number, and spacing of vent portions 1102 may be varied according to various alternative embodiments. As shown in FIG. 38B, each vent portion 38B may be formed by providing a chamfered notch or recess that reduces the width of a seal from, for example, 5 mm to 2 mm and has a width at the inner edge of the seal portion of approximately 0.5 inches. As noted herein, the notch may be provided by a relatively weaker seal portion, or alternatively, a void in the seal portion.

Figure 39A:
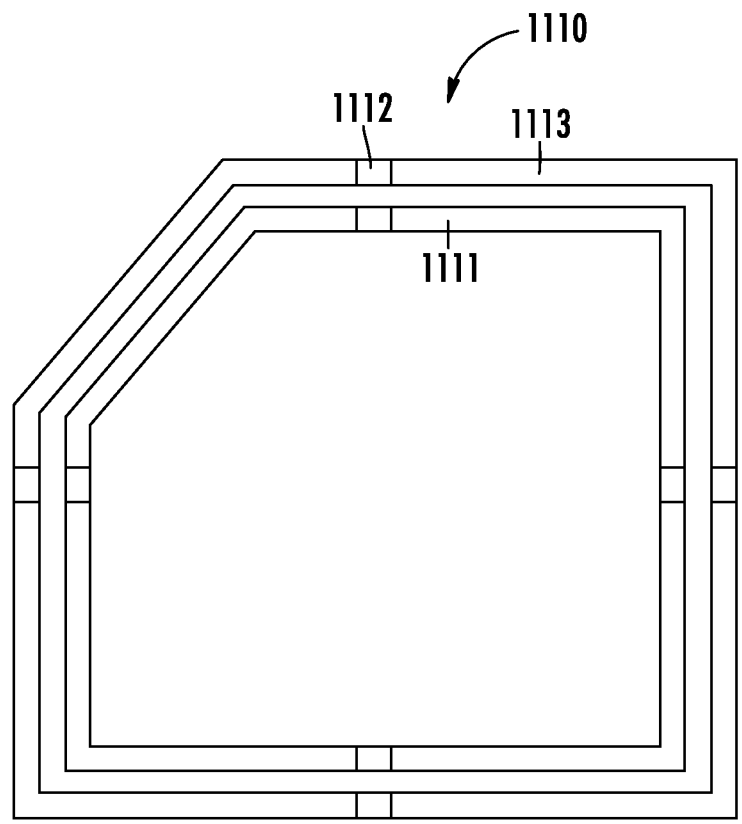
Figure 39D:
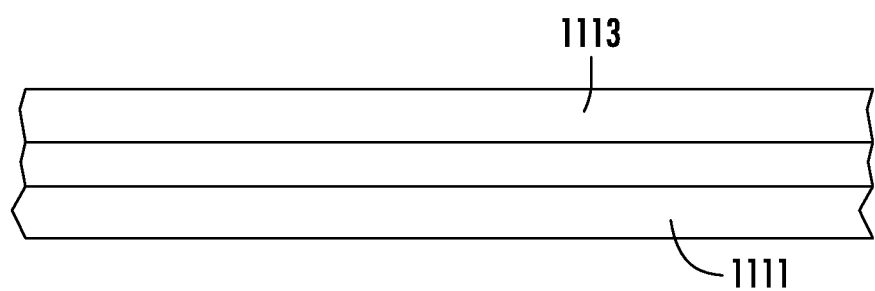
Figure 39B:
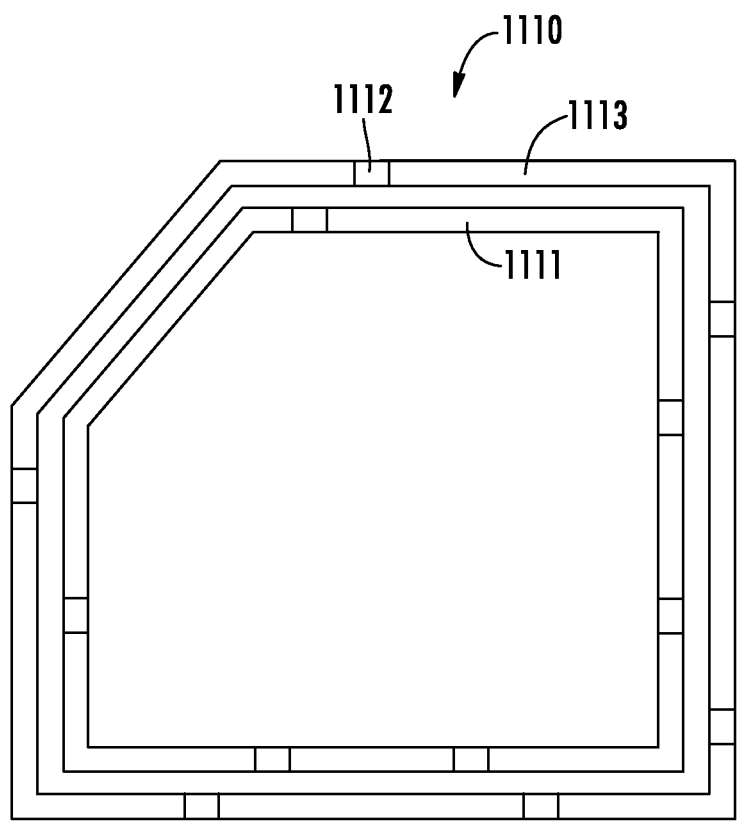
Figure 39C:
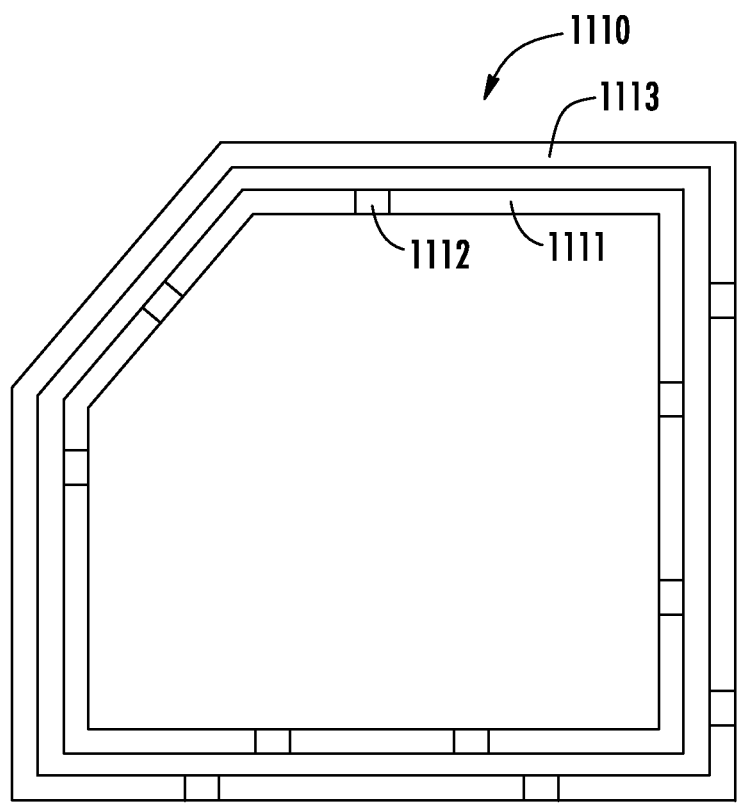

Referring to FIG. 39A, a seal portion 1110 is shown according to an exemplary embodiment, and includes an inner seal portion 1111 and an outer seal portion 1113. Inner and outer seal portions 1111 and 1113 generally include straight sides that run along each other in a generally parallel fashion. As shown in FIG. 39, each of seal portions 1111, 1113 includes four seal portions 1112 (e.g., one vent portion on each intermediate length side, and one vent portion on each long side) provided at the midpoint of sides of seal portion 1110. the size, number, placement, and spacing of vent portions 1112 may be varied according to various alternative embodiments. In one embodiment, inner and outer seal portions 1111, 1113 may each include six vent portions (see FIG. 39B). For example, inner and outer seal portions 1111 and 1113 may include a single vent portion on each of the intermediate length sides and two vent portions on each of the longer length sides. The vent portions may be staggered relative to each other and may be positioned based on a desired venting configuration (e.g., with the vents on the long sides of inner seal 1111 staggered to the inside of the vent portions on the long sides of outer seal portion 1113, etc,). Furthermore, inner and outer seal portions 1111 and 1113 may have differing numbers of vent portions (e.g., inner seal portion 1111 may have six vent portions while outer seal portion may have four vent portions, vice-versa, etc.) as shown in FIG. 39C.

Referring now to FIGS. 40-42, a packaged food product 1210 is shown according to an exemplary embodiment. Product 1210 includes a packaging 1214 configured to hold a food product (not shown). Packaged food product 1210 and packaging 1214 may include one or more of the features described in the various other embodiments described herein. According to an exemplary embodiment, packaging 1214 includes a top, or upper portion 1224 (e.g., a flat film, etc.) and a bottom, or lower portion 1222 (e.g., a formed member, receptacle cup, etc.).

Top portion 1224 is sealed to bottom portion 1222 via a seal portion 1226 to form an interior 1228. A food product is sealed within interior 1228 via top and bottom portions 1224, 1222 and seal portion 1226. The food product may be any of a variety of food products intended to be heated in a microwave oven, including any of the food products described with respect to food product 12 discussed herein, such as hamburgers, hot dogs, hot dogs wrapped in dough, sandwiches, etc.

Top film 1224 may be a generally flat film similar to film 24. In some embodiments, film 1224 may be a flexible film, while according to other embodiments, film 1224 may be all or partially made up of semi-flexible or rigid portions. Film 1224 may generally be sized and shaped such that the outer periphery of top film 1224 is generally aligned with the outer periphery of bottom film 1222. Top film 1224 may form a pull tab 1240 configured to enable a user to peal top film 1224 away from bottom film 1222. According to some embodiments, top film 1224 may be made of a lamination of materials, including an absorbent layer, various sealants, and/or polymer films. For example, the film may be a co-extruded laminate of a barrier film (e.g., ethylene vinyl alcohol copolymer or EVOH, etc.), a sealant (e.g., ionomer, polyethylene, ethyl vinyl acetate or EVA, etc.), and structural layers (e.g., nylon, polypropylene, etc.). The non-conforming or base film includes oriented polyethylene terephthalate (OPET) layer, adhesive (e.g., polyethylene), and a woven or a non-woven absorbent material layer (e.g., cellulose and polypropylene).

Bottom film 1222 may be formed using any suitable process, including vacuum-forming, flow-wrapping, etc. Bottom film 1222 forms interior 1228 and includes a flat portion 1230 (e.g., a rim, flange, lip, etc.) extending about the upper periphery of interior 1228. The shape and size of interior 1228 and/or flat portion 1230 may be varied to provide a desired packaging type and/or to accommodate a specific food product. In some embodiments, the outer periphery of flat portion 1230 forms a rectangular, or square shape, while in other embodiments, other shapes may be formed, including circular, oval, irregular, etc. For example, as shown in FIGS. 40-42, interior 1228 may have a generally rectangular cross-section except that one corner is instead rounded, providing a shape having two substantially straight sides and one curved side (e.g., a curved "side" formed by two substantially straight portions joined by a curved portion). According to exemplary embodiments, the curved side helps to focus the pulling force on the sealant by the consumer when separating the films due the reduced area that initially absorbs the force when the pulling/separation begins. The depth of interior 1228 may be varied to provide a packaging having a suitable depth for a particular food product. The curved side may conform to a food product, form a space for a pull-tab, etc.

Bottom film 1222 may be made of any suitable material, including a number of flexible, semi-rigid, or rigid polymers, including any of the materials described herein in connection with film 22. In some embodiments, bottom film 1222 may be semi-rigid and have sufficient rigidity to maintain its shape and support the food product during sale, preparation, and consumption of the food product. In some embodiments, bottom film 1222 is made from a lamination of materials, including various sealants and/or polymer films.

According to an exemplary embodiment, seal portion 1226 is configured to provide a gas and/or moisture seal between interior 1228 and the exterior environment. Seal 1226 may be formed in a variety of ways, including heat sealing the top and bottom films together, welding operations, using one or more adhesives, or combinations thereof. In some embodiments, seal portion 1226 is formed by melting the top and bottom films together using an appropriate heat, pressure, etc.

According to an exemplary embodiment, seal 1226 is configured to provide venting features to the packaging to release gas, steam, and/or moisture from interior 1228 during preparation (e.g., heating) of the food product (e.g., by way of a microwave oven). For example, one or more portions of seal 1226 may be configured to provide a "vent" to permit the release of steam, moisture, etc.

In one embodiment, seal 1226 is configured such that seal 1226 vents at the approximate midpoints along straight sections of seal 1226. For example, referring to FIG. 41, seal 1226 may include two relatively longer straight sections 1232, 1234, and two relatively shorter straight sections 1236, 1238. Upon heating of product 1210, seal 1226 may be configured to vent at the approximate midpoints of sections 1232, 1234 (e.g., the longer straight sides). In some embodiments, a weakened portion of seal 1226 may be provided at one or more locations about seal 1226 to promote venting, while in other embodiments, seal 1226 may have a generally uniform size, shape, and seal strength about its periphery, and seal 1226 may tend to rupture at desired locations due to the geometry of seal 1226 (e.g., by providing an elongated packaging having corresponding elongated straight seal portions configured to provide vents at their approximate midpoints).

While seal 1226 is shown in FIG. 41 to have two relatively longer sections (sections 1232, 1234), accordingly to other embodiments, other configurations and/or geometries may be used to control the venting of product 10. For example, seal 1226 may be generally square, multi-sided, etc., and the venting may be directed through the seal by providing one or more relatively longer straight sections (one or more of which provide venting at an approximate mid section of the straight portion). As such, one or more vent portions may be provided by the approximate mid-sections of various straight-sided sections of the seal without having to provide any weakened portions of seal. In yet further embodiments, seal 1226 may be configured to vent at discreet locations along one or more sections of the vent (e.g., by weakened portions, etc.) as discussed with respect to various other embodiments disclosed herein.

In some embodiments, seal 1226 may extend about the upper periphery of interior 1228, while in other embodiments, one or more positions of seal 1226 may be offset or spaced apart from seal 1226. For example, referring back to FIGS. 9-11, a straight-sided (e.g., square, polygonal, etc.) seal may be provided about a circular or rounded interior, such that the seal tends to vent at the midpoint of the longer sides rather than, for example, at the corners of the seal. Further, while seal 1226 is shown as having a generally constant width 1242 about interior 1228, according to other embodiments the width of seal 1226 may be varied at one or more sections along its length.

The various embodiments of the packaged food product disclosed herein provide many benefits to consumers. For example, the packaged food product provides an "on-the-go" food product having user-friendly packaging requiring only a "single step" heating in a microwave oven. Control of steam and moisture content within the packaging during heating decreases preparation time, provides for optimal moisture content of the food product, and ensures an evenly heated food product. Further, the anti-fog treatment of the packaging reduces water droplet formation and maintains an aesthetically pleasing appearance for consumers. Further yet, because the food product may be heated without needing to open the packaging, no additional materials are required (e.g., a napkin, paper towel, etc.), no messes are made within the microwave (e.g., due to spills, splattering, melting, etc. resulting from unpackaged food products or open packagings), and the food product may be eaten right out of the packaging after heating. The creation of a "steam dome" assists in both faster cooking and providing an easy peel feature by weakening the seal through the escape of steam.

Furthermore, it should be noted that while in various embodiments specific dimensions have been provided, such dimensions are not limiting such that the embodiments disclosed herein may be usable with a variety of dimensions not specified herein (e.g., such as the width of a seal of seal portion, the length and/or width of a vent portion, etc. Further, the number, size, spacing, and shape of various features may also be varied from the specific embodiments shown herein (e.g., the shape of a seal or seal portion, vent, of peelable corner portion, etc.). For example, in some embodiments, one, some, or all corners of a packaging may provide an "easy-peal" feature. Further, reliefs formed into seal bars usable to form vent portions may varying dimensions for length, width, and depth. For example, while the "depth of the relief is shown in some embodiments as being 0.010 inches, according to various other embodiments, the depth of the relief may be more r less than 0.010 inches (e.g., 0.005 inches, 0.003 inches, 0.015 inches, etc.). All such variations in the size shape, number, positioning, etc. of the various components and features disclosed herein are within the scope of the present disclosure.

It is important to note that the construction and arrangement of the elements of the products and methods as shown in the exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the various embodiments. Accordingly, all such modifications are intended to be included within the scope of the present disclosure as defined in the appended claims. The order or sequence of any process or method steps may be varied or re-sequenced according to alternative embodiments. Other substitutions, modifications, changes, and/or omissions may be made in the design, operating conditions, and arrangement of the exemplary embodiments without departing from the spirit of the present disclosure.

What is claimed is:

1. A package comprising:
    food;
    a first sheet comprising a first layer,
    a second sheet comprising a second layer and an absorbent layer, the second layer coextensive and laminated with the absorbent layer, the absorbent layer disposed between the first layer and the second layer, the food resting on the absorbent layer;
    the first layer and the second layer being directly bonded together to form a bonding region two-dimensionally enclosing the food, the bonding region forming a non-hermetic seal, the bonding region having an inner perimeter and an outer perimeter, a width of the non-hermetic seal extending from the inner perimeter to the outer perimeter, the non-hermetic seal having a first end at the inner perimeter and a second end at the outer perimeter;
    directly adjacent to the first end and the second end: the first sheet being unbonded to the second sheet to enable fluid flow across the non-hermetic seal;
    wherein the package defines (a) a pocket in which a heat activated and/or moisture activated scent is confined and (b) a channel extending between the pocket and the bonding region;
    the package being at a freezing or a refrigerated temperature.

2. A method of using the package of claim 1, the method comprising:
    inserting the package into a microwave and activating the microwave;
    wherein the non-hermetic seal exists at the moment the package is inserted into the microwave and before the microwave is active.

3. The package of claim 1, wherein the scent is confined in the pocket such that a portion of the package directly surrounding the pocket does not include the scent.

4. The package of claim 1, wherein the scent is in contact with only a limited portion of the absorbent layer.

* * * * *